United States Patent
Hiraoka

(10) Patent No.: US 9,114,592 B2
(45) Date of Patent: Aug. 25, 2015

(54) METHOD FOR MANUFACTURING FINE CONCAVE-CONVEX PATTERN AND SHEET FOR MANUFACTURING FINE CONCAVE-CONVEX PATTERN

(71) Applicant: Toshiro Hiraoka, Kanagawa-ken (JP)

(72) Inventor: Toshiro Hiraoka, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/673,279

(22) Filed: Nov. 9, 2012

(65) Prior Publication Data

US 2013/0065007 A1     Mar. 14, 2013

Related U.S. Application Data

(62) Division of application No. 12/711,644, filed on Feb. 24, 2010, now Pat. No. 8,323,520.

(30) Foreign Application Priority Data

Feb. 25, 2009   (JP) .................................. 2009-042545

(51) Int. Cl.
*B32B 3/00* (2006.01)
*B32B 3/26* (2006.01)
(Continued)

(52) U.S. Cl.
CPC . *B32B 3/263* (2013.01); *B32B 3/02* (2013.01); *B32B 7/02* (2013.01); *B32B 37/025* (2013.01);
(Continued)

(58) Field of Classification Search
CPC ............ B32B 3/00; B32B 3/30; B32B 3/263; B32B 37/025
USPC .......................... 428/161, 163, 164, 172, 914
See application file for complete search history.

(56) References Cited

U.S. PATENT DOCUMENTS 4,407,695 A    10/1983   Deckman et al.
5,259,926 A    11/1993   Kuwabara et al.
(Continued)

FOREIGN PATENT DOCUMENTS

JP    2002-151381    5/2002
JP    2005-279807    10/2005
(Continued)

OTHER PUBLICATIONS

Office Action issued Jan. 29, 2013 in Japanese Application No. 2009-042545 (With English Translation).
(Continued)

*Primary Examiner* — Catherine A Simone
(74) *Attorney, Agent, or Firm* — Oblon, McClelland, Maier & Neustadt, L.L.P.

(57) ABSTRACT

According to a first aspect of the invention, a method for manufacturing a concave-convex pattern includes the steps of heating a sheet-like member, compressively bonding the sheet-like member, removing the sheet-like member after the compressively bonding, and transferring a pattern shape of a reverse concave-convex pattern layer to a surface of the substrate. The sheet-like member has a concave-convex pattern block on at least one of surfaces thereof, and is given flowability thereto by heating. The reverse concave-convex pattern layer is formed on the one of the surfaces, and continues over two or more concaves of the concave-convex pattern block so that the reverse concave-convex pattern layer meshes at least partially with the concave-convex pattern block. At least the reverse concave-convex pattern layer is left on the substrate. Here, the one of the surfaces has the concave-convex pattern block.

10 Claims, 13 Drawing Sheets

(51) Int. Cl.
  *B32B 3/02* (2006.01)
  *B32B 7/02* (2006.01)
  *B32B 37/00* (2006.01)
  *B32B 38/06* (2006.01)

(52) U.S. Cl.
  CPC ........... *B32B 38/06* (2013.01); *B32B 2307/416* (2013.01); *Y10T 156/1041* (2015.01); *Y10T 428/21* (2015.01); *Y10T 428/24545* (2015.01); *Y10T 428/24612* (2015.01)

(56) References Cited

U.S. PATENT DOCUMENTS

| | | | |
|---|---|---|---|
| 5,772,905 A | 6/1998 | Chou | |
| 6,508,559 B2 * | 1/2003 | Bacon et al. | 359/530 |
| 6,790,377 B1 | 9/2004 | Cohen | |
| 8,016,585 B2 * | 9/2011 | Komoriya et al. | 425/385 |

FOREIGN PATENT DOCUMENTS

| | | |
|---|---|---|
| JP | 2006-13453 | 1/2006 |
| JP | 2006-237312 | 9/2006 |
| JP | 2007-320071 | 12/2007 |
| JP | 2007320071 A * | 12/2007 |
| JP | 4068074 | 1/2008 |

OTHER PUBLICATIONS

Amit Kumar, et al., "Features of Gold Having Micrometer to Centimeter Dimensions can be Formed Through a Combination of Stamping with an Elastomeric Stamp and an Alkanethiol "Ink" Followed by Chemical Etching", Appl. Phys. Lett., vol. 63, No. 14, Oct. 4, 1993, pp. 2002-2004.

* cited by examiner

METHOD FOR MANUFACTURING FINE CONCAVE-CONVEX PATTERN AND SHEET FOR MANUFACTURING FINE CONCAVE-CONVEX PATTERN

CROSS REFERENCE TO RELATED APPLICATION

The present application is a divisional application of U.S. Ser. No. 12/711,644, filed on Feb. 24, 2010, which is based upon and claims the benefit of priority from the prior Japanese Patent Application No. 2009-042545, filed on Feb. 25, 2009, the entire contents of which are incorporated herein by reference.

FIELD OF THE INVENTION

The present invention relates to method for manufacturing a fine concave-convex pattern and a sheet for manufacturing fine concave-convex pattern.

DESCRIPTION OF THE BACKGROUND

As a technique for fabricating a fine concave-convex pattern at relatively low cost, a method using a single particle layer of fine particles is proposed (see, e.g., U.S. Pat. No. 4,407,695). Nanoimprint lithography is proposed as another technique for manufacturing a fine concave-convex pattern on a substrate (see, e.g., U.S. Pat. No. 5,772,905).

As another technique for manufacturing a fine concave-convex pattern on a substrate, the method called lithography, such as micro contact printing, is proposed (see, e.g., A. Kumar and G. M. Whitesides: Appl. Phys. Lett. 63 and 2002 (1993)). Furthermore, a method of applying pressure to an original disk for nanoimprint lithography with pneumatic pressure or hydraulic pressure via a flexible sheet is proposed (see, e.g., JP-A 2006-13453 (Kokai)).

As another method for forming a fine concave-convex pattern on an uneven substrate, a method using a sheet with a single particle layer formed on a flexible sheet via a thermosoftening layer (see, e.g., JP 4068074). As another method for forming a fine concave-convex pattern on a substrate, a method is proposed. The method includes preparing a polymer film on the fine concave-convex pattern of an original disk, which is followed by pressing the original disk on a substrate to transfer the pattern (see, e.g., JP-A 2006-237312 (KOKAI)).

However, even if any of the above-mentioned methods is employed, there still exists a challenge that it is difficult to form a fine concave-convex pattern, without damaging a large substrate with an uneven pattern.

SUMMARY OF THE INVENTION

According to a first aspect of the invention, a method for manufacturing a concave-convex pattern includes the steps of heating a sheet-like member, compressively bonding the sheet-like member, removing the sheet-like member after the compressively bonding, and transferring a pattern shape of the reverse concave-convex pattern layer to a surface of the substrate. The sheet-like member has a concave-convex pattern block on at least one of surfaces of the sheet-like member, and is given flowability to the sheet-like member by heating. The reverse concave-convex pattern layer is formed on the one of the surfaces, and continues over two or more concaves of the concave-convex pattern block so that the reverse concave-convex pattern layer meshes at least partially with the concave-convex pattern block. At least the reverse concave-convex pattern layer is left on the substrate. The one of the surfaces has the concave-convex pattern block.

According to a second aspect of the invention, a sheet for manufacturing a concave-convex pattern includes a sheet-like member and a reverse concave-convex pattern layer. The sheet-like member has a concave-convex pattern on one of surfaces thereof, and includes a thermoplastic resin. The reverse concave-convex pattern layer continues over two or more concaves of the concave-convex pattern layer, and meshes at least partially with the concave-convex pattern layer. In addition, either one of the concave-convex pattern layer and the reverse concave-convex pattern layer includes metallic elements or metalloid elements.

BRIEF DESCRIPTION OF DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENTS

Figure 1:
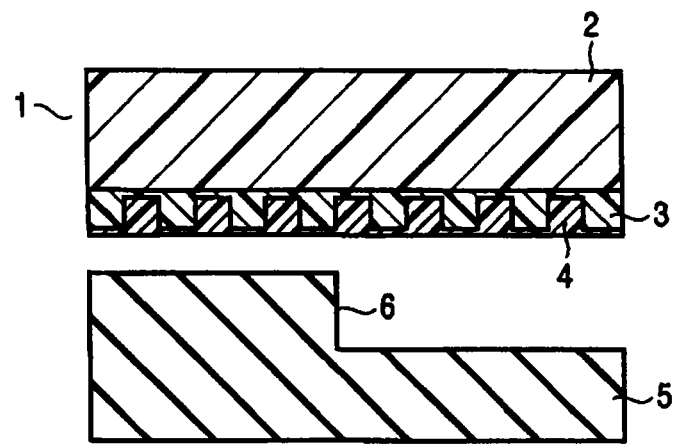
FIG. 1 is a sectional view showing a step in a method for manufacturing a concave-convex pattern according to an embodiment.

Embodiments of the present invention will be explained with reference to drawings below. The same reference numerals denote the same parts. All the figures are schematic views for illustrating the embodiments of the invention. The shapes, dimension ratios, etc. may differ from actual models. The shapes or dimension ratios may be subjected to design changes with reference to the following descriptions and publicly known techniques.

First Embodiment

A method for manufacturing a concave-convex pattern according to a first embodiment is explained with reference to FIGS. 1 to 4. A sheet in the embodiment widely includes two-dimensional objects, such as a film, a plate, etc.

As shown in FIG. 1, a substrate 5 and a sheet 1 for manufacturing a concave-convex pattern are prepared on the substrate 5. The substrate 5 may have a step 6 on its surface. In the sheet 1 for the manufacturing a concave-convex pattern, a concave-convex pattern block is formed on a sheet-like member 2. The concave-convex pattern block can be directly stamped on sheet-like member 2. Alternatively, a layer having the concave-convex pattern, i.e., a concave-convex pattern layer 3 may be laminated on the sheet-like member.

When the concave-convex pattern block is directly stamped on the sheet-like member, it is possible to soften the concave-convex pattern block at the time of heating to soften the sheet-like member. Therefore, it is advantageous to easily adapt a reverse concave-convex pattern layer to steps of the substrate. Further, when forming the sheet-like member with a water soluble resin etc., for example, the reverse concave-convex pattern layer can be easily exposed by water washing. On the other hand, when the concave-convex pattern layer is laminated on the sheet-like member, neither the concave-convex pattern layer nor the reverse concave-convex pattern layer easily receive shear stress to be applied in a direction along the surface of the substrate, so that the concave-convex pattern is resistant to deformation when the softened sheet-like member adapts to the steps of the substrate. Since the interface between the sheet-like member and the concave-convex pattern layer can be made flat, it is advantageous that the sheet-like member can be easily removed. When removing the sheet-like member, the concave-convex pattern layer can serve as a protective layer to protect the reverse concave-convex pattern, thereby allowing it to prevent the concave-convex pattern from deformation.

The concave-convex pattern may be formed over the whole surface of the sheet for manufacturing a concave-convex pattern, or may be formed only on a partial area of the sheet. There can be a blank space lacking the concave-convex pattern, for example, a space where the sheet-like member terminates so that a carrier sheet runs over or a space where the concave-convex pattern is not formed from the beginning. In such a case, picking up the blank space allows it to easily remove the carrier sheet, etc. Further, when the concave-convex pattern is formed just inside the outermost circumference of the substrate, a small blank space lacking the concave-convex pattern makes it difficult to pick up in order to remove the sheet member made with pressure bonding, thereby making it difficult to remove the layer with the imprinted reverse concave-convex pattern from the substrate.

The pattern of the concave-convex pattern block is not limited to one kind. Two or more kinds of patterns may be formed on a single sheet for manufacturing a concave-convex pattern.

The concave-convex pattern block can be formed using publicly known techniques, such as nanoimprint lithography and optical lithography. For example, a liquid raw material for the sheet-like member may be drawn out and casted on a template having a concave-convex pattern. The concave-convex pattern block can be formed also by injection molding using a metallic mold with a concave-convex pattern.

The two-dimensional shape of the sheet for manufacturing a concave-convex pattern is not particularly limited, and various shapes, such as a belt-like sheet, a rectangular sheet, or a disk sheet, can be taken. A belt-like sheet may have a tube-like shape of which two longitudinal edges are connected. The belt-like sheet is suitable for carrying by a roll-to-roll method. A rectangular sheet and a disk-like sheet are suitable for placing a sheet on a substrate to substrate, such as a wafer. A belt-like sheet can be coated continuously and rapidly to form a reverse concave-convex pattern layer, an adhesive layer, etc.

On the other hand, the rectangular sheet, the disk-like sheet, etc. are excellent as thicknesses of layers formed by spin coating can be controlled to an accuracy of tens of nm. The sheet for manufacturing a concave-convex pattern may be formed in a rectangular shape or a disk shape. Two or more sheets with such shapes may be connected with each other using a belt-like carrier sheet.

The thickness of the sheet for manufacturing a concave-convex pattern is not particularly limited. The thickness of the sheet is preferably 5 µm or more, and more preferably 10 µm or more for easy handling. A bend performance is required to be given to the sheet for manufacturing a concave-convex pattern when carrying the sheet for manufacturing a concave-convex pattern by a roll-to-roll method. The thickness of the sheet for manufacturing a concave-convex pattern is preferably 100 µm or less, and more preferably 50 µm or less for the bend performance. The thinner the thickness of the sheet for manufacturing a concave-convex pattern is, the less the peeling-off thereof from the substrate due to a residual stress, etc is.

In the sheet for manufacturing a concave-convex pattern shown in FIG. 1, the concave-convex pattern layer 3 is laminated on the sheet-like member 2. The reverse concave-convex pattern layer 4 may be laminated on the concave-convex pattern block so that convexes of the reverse concave-convex pattern layer 4 fits to infill the concaves of the concave-convex pattern block. The term "fit" means that a convex on a side enters a concave on the other side, and then both the convex and concave complementarily couple with each other. The concave-convex pattern block and the reverse concave-convex pattern layer do not necessarily need to be directly in contact with each other at the interface therebetween, and may have an interface layer therebetween.

Further, an adhesive layer for bonding the substrate and the sheet for manufacturing concave-convex pattern can be applied therebetween. The material of the adhesive layer is not particularly limited. Well-known adhesives, such as thermoplastics and a B-stage resin can be employed. The reverse concave-convex pattern layer may double as the adhesive layer. The reverse concave-convex pattern layer may be made to adhere to the substrate with a van der Waals' force, etc. without providing the adhesive layer.

It is desirable to cover the surface of the sheet for manufacturing a concave-convex pattern to be compressively bonded to the substrate with a protective sheet (not shown). The protective sheet is removed before the compressively bonding of the sheet for manufacturing a concave-convex pattern to the substrate. In order to improve a carrying performance for the sheet for manufacturing a concave-convex pattern, a carrier sheet may be laminated to the carrying path-contact surface of the sheet for manufacturing a concave-convex pattern. This carrier sheet serves as a supporting member, and increases a tensile strength of the sheet for manufacturing a concave-convex pattern.

It is preferable that a glass transition temperature of the carrier sheet is higher than that of the sheet-like member in order to maintain a sufficient tensile strength of the sheet-like member to be softened. The glass transition temperature of the carrier sheet is preferably higher than that of the sheet-like member by 5° C. or higher, and more preferably by 10° C. or higher. When the glass transition temperatures of these members are close to each other by a difference of 5° C. or lower, it is difficult to sufficiently soften the sheet-like member. The glass transition temperature of the sheet-like member or the carrier sheet can be measured with differential scanning calorimetry (DSC).

The DSC is desired to be conducted based on the following measurement standard.

ISO 11357-1 1997 Plastics—Differential scanning calorimetry (DSC)—Part 1: General principles; and
ISO 11357-2-1999 Plastics—Differential scanning calorimetry (DSC)—Part 2: Determination of glass transition temperature; P-310.

The material of the sheet-like member is not particularly limited, if the material is softened by heating, but can be selected from thermoplastics or a B-Stage resin. The sheet-like member is removed in post-processing. An organic polymer material which contains many oxygen atoms without S1, AL, etc. is easy to remove by oxygen dry etching, and therefore preferable.

Examples of the organic polymer material include the followings:
polyvinyl, such as polyvinyl alcohol, polyaceticacid vinyl, and polyvinyl chloride;
cellulose ether;
polyalkylene oxide, such as polyethylene oxide and polypropylene oxide;
polyolefin, such as polyethylene and polypropylene;
polystyrene derivatives, such as polystyrene and poly alpha-methylstyrene;
an acrylic resin and its derivatives;
polyester, such as polyethylene terephthalate;
polycarbonate;
a fluororesin;
a phenol resin and its derivatives; and
an epoxy resin etc.

The examples can include copolymers of the above-mentioned materials, such as an ABS resin, an AS resin, etc. A thermoplastic resin is more preferable selected in order not to yield residual stress due to cure shrinkage. A plasticizer, an antioxidant, an ultraviolet absorber, an antiblocking agent, a slip agent, a coloring agent, an antistatic agent, etc. can also be added to the organic polymer material.

As the sheet-like member, thermoplastic elastomer, such as a styrene system, an olefin system, a polyvinyl chloride system, a urethane system, an ester system, and an amide system, may be employed. When cooling again the heated soft sheet-like member to cure, the residual strain resulting from thermal expansion and contraction, etc. can prevent the reverse concave-convex pattern layer from peeling off from the substrate. The sheet for manufacturing a concave-convex pattern could undergo an elongation due to the tensile stress at the time of carrying the sheet by the roll-to-roll method, etc. in some cases. The sheet for manufacturing a concave-convex pattern undergoes an excessive elongation to create a risk of distorting or cracking the sheet. When using a thermoplastic elastomer for the sheet-like member in order to avoid the risk, it is required to use a carrier sheet with a high tensile strength in combination with the sheet for manufacturing a concave-convex pattern. When a layer including the thermoplastic elastomer is disposed between the carrier sheet and the reverse concave-convex pattern layer, the reverse concave-convex pattern layer does not peel from the substrate as a result of the residual strain of the carrier sheet.

The thickness of the sheet-like member is not particularly limited, and can be optionally determined according to a height of the step 6 on the surface of the substrate 5. From a viewpoint of the adaptiveness of the sheet-like member to the substrate step, the sheet-like member preferably has a thickness of 3 times or more of the height of the step of the substrate, and more preferably has a thickness of 10 times or more thereof. However, when the sheet-like member is too thick, it becomes difficult to remove the sheet-like member by etching. It is required to design the thickness of the sheet-like member while it is required to consider a desirable thickness of the sheet for manufacturing a concave-convex pattern or the carrier sheet. For example, when using an LED substrate having the step 6 with a height of about 0.3 μm arising from an electrode for the substrate 5, it is preferable to combine the sheet-like member having a thickness of 1 μm to 5 μm with a 10 μm-thick carrier sheet. Alternatively, the sheet-like member having a thickness of about 15 μm can be employed without providing the carrier sheet.

The carrier sheet may be a flattened material, such as an imperforate film or a porous film. The carrier sheet may be a woven cloth or a nonwoven cloth. The carrier sheet may also be a sheet-like fiber-reinforced plastic (FRP). The material for the carrier sheet is not particularly limited, and there are metals such as Al and Cu, glass, carbon, ceramics, an organic polymer material, etc. In addition, in order to provide the carrier sheet with an excellent flexibility, an organic polymer material is preferable. Therefore, using an organic polymer material allows it to make the sheet for manufacturing a concave-convex pattern closely in contact also with a curved substrate without applying high pressure. Also in order to remove the sheet later, the dry etching using oxygen gas is easy to remove the organic polymer material with a high content of oxygen and without Si or Al.

Examples of the organic polymer material include kinds of polyolefin such as polyethylene and polypropylene, kinds of polyester such as polyethylene terephthalate (PET), kinds of polycarbonate, kinds of cellulosics such as acetyl cellulose, kinds of polyimide, and kinds of polyamide. Kinds of polyester such as PET, etc. are excellent in a relatively low cost and a certain level of a heat resistance. A plasticizer, an antioxidant, an ultraviolet absorber, an antiblocking agent, a slip agent, a coloring agent, an antistatic agent, etc. can also be added to the organic polymer material if needed.

Although the thickness of the carrier sheet is not particularly limited, the thickness of the carrier sheet is preferably not less than about 0.5 µm and not more than about 30 µm. More preferably, the thickness of the carrier sheet is not less than about 1 µm and not more than about 15 µm. When the carrier sheet is too thin, the carrier sheet easily breaks or wrinkles to be difficult to handle. On the other hand, when the carrier sheet is too thick, the carrier sheet is difficult to remove by dry etching. In addition, the sheet for manufacturing a concave-convex pattern easily peels from the substrate owing to a thermal stress, etc.

The sheet-like member can also be combined with a reinforcement member in order to increase the tensile strength and dimensional stability in an in-plane direction thereof. The suppression of thermal expansion and contraction reduces a residual strain resulting from the difference between the thermal expansion coefficients of the substrate and the sheet for manufacturing a concave-convex pattern. Fine particles such as silica, a glass fiber, a mesh including a glass fiber, a woven cloth, and a nonwoven cloth can be employed for the reinforcement member. Combining with such a reinforcement member easily leads to a decrease in the adaptiveness of the sheet-like member to steps of the substrate. Therefore, the sheet-like member is preferably set to be thicker than the sheet-like member without the reinforcement member. For example, when using a mesh or a nonwoven cloth, the sheet-like member is preferably as thick as the mesh or the woven cloth to be used.

The concave-convex pattern has at least one of a concave/convex size of 1 µm or less, and a gap of 1 µm or less between the adjacent concaves/convexes. The concaves/convexes are fabricated. A two-dimensional shape of the concave-convex pattern is not particularly limited. Examples of the two-dimensional shape include a pattern having dots arranged with a pitch of 1 µm or less. Examples of the concave-convex pattern include an ensemble pattern of fine protrusions which are protruding dots, and an ensemble pattern of fine holes which are caving dots. The "pitch" means a state where a protrusion or a hole exists repeatedly with a constant distance. For example, the pitch means that a center-to-center distance between the adjacent protrusions is uniform. Or, the pitch means that a center-to-center distance between the adjacent holes is uniform. However, there may be some irregularities due to variation in a manufacturing process, etc.

Although the size of fine protrusions or fine holes is not particularly limited, the size thereof is 1% to 100% of the pitch. The size of fine protrusions is an average of rolling radiuses of sections to be obtained when the fine protrusions are sliced at a height of ½ of the height of the fine protrusions. The size of fine holes is an average of rolling radiuses of sections to be obtained when the fine holes are sliced at a depth of ½ of the depth of the fine holes. The radiuses of 100 pieces of the fine convex and concave portions randomly selected were measured using an atomic force microscope, etc. to average the radiuses thereof (arithmetic average) obtained, thereby yielding the average radius. The radius is defined as a turning radius.

Although the height of the fine protrusions or the depth of the fine holes is not particularly limited, the height or the depth is about 1% to 1000% of the pitch.

As a two-dimensional shape of another concave-convex pattern, there is a pattern where straight lines or curved lines having a length of 1 µm or less are arranged with a pitch of 1 µm or less. Although the difference between the heights of the line segment and the basal plane of the concave-convex pattern is not particularly limited, the difference is about 1% to 1000% of the pitch.

When using these concave-convex patterns for manufacturing an antireflective structure, a diffraction grating structure, etc. of optical elements or for a template of the structures, a concave-convex pattern with a pitch of 0.1 µm to 0.4 µm is preferably used.

The thickness of the concaves of the concave-convex pattern layer or the reverse concave-convex pattern layer is not limited particularly. However, the thickness of the concaves thereof is preferably 1% to 60% of the thickness of the convexes, or more preferably 5% to 20% of the thickness of the convexes. When the concaves are too thick, it becomes difficult to etch the substrate with a high contrast. On the other hand, when the concaves are too thin, the sheet-like member easily breaks, thereby causing peel-off thereof from the substrate due to break-in of the softened sheet-like member, or thereby causing dust trapping.

Materials constituting the concave-convex pattern layer 3 and the reverse concave-convex pattern layer 4 are not particularly limited. The materials include organic materials such as an organic polymer, metals, e.g., Al, oxides such as silica, alumina, etc., silicon, silicon compounds, compound semiconductors, and ceramics. A method for manufacturing films of the materials is not particularly limited, but well-known techniques, such as a coating technique, vacuum deposition, CVD, sputtering, and plating, are employed. Films of silica, etc. can be made using a sol-gel method.

An organic polymer is soft and suitable for forming a film, and is easily given a concavo-convex shape, thereby yielding an excellent leveling performance to cover the convexoconcave. Examples of the organic polymer include the followings:

kinds of polyvinyl, such as polyvinyl alcohol;
kinds of polyalkylene oxide, such as cellulose ether, polyethylene oxide, and polypropylene oxide;
polyolefin, such as polyethylene and polypropylene;
polystyrene derivatives, such as polystyrene, and poly alpha methylstyrene;
an acrylic resin and its derivatives;
kinds of polyester such as polyethylene terephthalate;
kinds of polycarbonate;
a fluororesin;
a phenol resin and its derivatives;
a silicone resin;
a polyamide resin;
a polyimide resin; and
an epoxy resin.

The organic polymer materials or the precursors thereof are dissolved in a solvent to be a solution, and the solution is applied with methods such as a spin coating method and a doctor blade method. Alternatively, after applying a light-curing resin composition containing no solvent, light curing may be carried out with ultraviolet irradiation, etc. The light curing is carried out while compressively bonding a sheet separately prepared in the same way as ultraviolet imprinting, thereby allowing it to reduce the thickness of the concaves. A difference between the thicknesses of the concaves and the convexes can be increased, thereby allowing it to transfer the concave-convex pattern on the substrate with a high contrast.

Either one of the two layers preferably contains a metallic element or a metalloid element to acquire a resistance to dry etching. Here, the two layers are the concave-convex pattern layer 3 and the reverse concave-convex pattern layer 4. The selectively containing of a metallic element or a metalloid element allows it to well transfer the concave-convex pattern by dry etching. It is preferable to combine the layer containing a metallic element or a metalloid element with the layer not containing the elements.

The metallic element is an element having a metallic character, and the examples of the metalloid element include B, Si, Ge, As, Sb, Te, and Po. When safety and affinity with a semiconductor process is taken into consideration, Al, Si, and Ti are preferable. It is preferable from the view point of safety that the metallic and metalloid elements combine with oxygen atoms to be chemically stable in the layers. An organometallic complex can also be made from the metallic and metalloid elements. Silicone resin, poly pentamethyl disilyl styrene, etc. are employed as the specific material including the metallic and metalloid elements. The silicone resin which is made of Si combined with oxygen atoms is particularly preferable. Polystyrene, an acrylic resin, and those derivatives are employed as the specific material not including the metallic and metalloid elements.

At least one of the glass transition temperatures of the concave-convex pattern layer and the reverse concave-convex pattern layer is preferably higher than a glass transition temperature of the sheet-like member to be heated and softened. Accordingly, even when the sheet-like member softens, the shape of the concave-convex pattern is maintained. On the other hand, when the concave-convex pattern layer or the reverse concave-convex pattern layer is made of an elastomer, it is preferable that the glass transition temperature of the concave-convex pattern layer or the reverse concave-convex pattern is lower than that of the sheet-like member.

In both cases, the difference between the two glass transition temperatures is preferably not less than 5° C., and more preferably not less than 10° C.

In the concave-convex pattern manufacturing method of this embodiment, the concave-convex pattern layer or the reverse concave-convex pattern layer is compressively bonded to the substrate with heating the sheet-like member to be softened. Then the softened sheet-like member is cooled to be hardened again. Then, the sheet-like member shrinks so that a shear stress is applied between the substrates and the sheet-like member. For this reason, the concave-convex pattern layer or the reverse concave-convex pattern layer peels off easily from the substrate. However, when the concave-convex pattern layer and the reverse concave-convex pattern layer are made of an elastomer, the transition temperatures thereof are lower than the transition temperature of the sheet-like member. Even after the sheet-like member is hardened, the concave-convex pattern layer and the reverse concave-convex pattern layer are still soft. Therefore, after the sheet-like member is hardened, the shear stress is relaxed, thereby making the peel-off of the sheet-like member difficult. This allows it to thin the adhesive layer to adhere the concave-convex pattern layer or the reverse concave-convex pattern layer to the substrate. When the adhesive layer is thin, the concave-convex pattern corresponding to the reverse concave-convex pattern can be transferred to the substrate with a high contrast by etching.

The concave-convex pattern block and the reverse concave-convex pattern layer are continuous on the surface of the substrate, and are therefore resistant to expansion and contraction in an in-pane direction of the substrate. Since the concave-convex pattern block and the reverse concave-convex pattern layer mesh with each other, the interface therebetween is hard to separate, thereby causing no risk of deforming the concave-convex pattern. For example, even carrying the sheet for manufacturing a concave-convex pattern by a roll-to-roll method hardly produces a crack. Compressively bonding the concave-convex pattern block or the reverse concave-convex pattern layer to the substrate creates no risk of deforming the concave-convex pattern in an in-plane direction of the substrate. Around the steps of the substrate to which a strong shear stress is applied in an in-plane direction, the concave-convex pattern block or the reverse concave-convex pattern layer is decoupled by the shear stress, thereby making it difficult to deform the concave-convex pattern owing to expansion and contraction. In addition, the decoupling prevents uplifts of the concave-convex pattern block or the reverse concave-convex pattern layer around the steps. Therefore, the concave-convex pattern can be certainly formed also around the steps.

Particularly, both the concave-convex pattern layer and the reverse concave-convex pattern layer are continuous films, and do not have any portion which isolates to easily separate from surrounding areas as a particle does. Therefore, even if a strong tensile or shear stress is applied to the layers at the steps, the layers do not break, thereby creating no risk of producing flakes of the layers to be imported to a manufacturing process.

Figure 2:
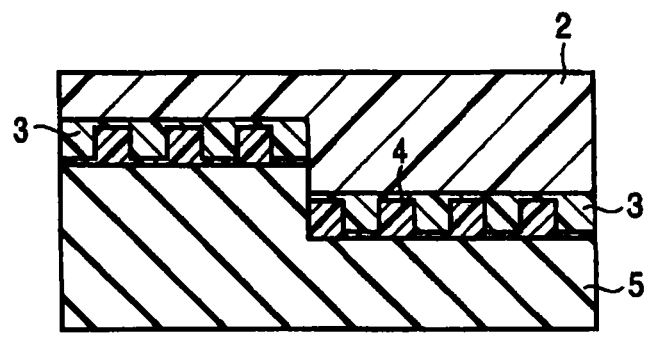
FIG. 2 is a sectional view showing a step in the method following FIG. 1.

As shown in FIG. 2, the sheet 1 for manufacturing a concave-convex pattern is placed on the substrate 5 to press the concave-convex pattern block of the softened sheet-like member 2 on the substrate 5. The term "softened" means increasing softness at least partially in a solid sheet-like member. That is, it is preferable to change a solid phase of the solid sheet-like member into a liquid phase thereof. The sheet-like member made of a crystalline solid is softened by heating the sheet-like member up to a melting temperature thereof. The sheet-like member made of an amorphous solid is softened by heating, and is preferably heated up to a glass transition temperature of the amorphous solid to fit to steps of the substrate. An amorphous solid is soft above the glass transition temperature thereof. Therefore, the concave-convex pattern of the concave-convex pattern block or the reverse concave-convex pattern layer easily deforms above the glass transition temperature. However, such a deformation will not take place below the glass transition temperature. That is, the sheet-like member made of an amorphous solid is suitable to maintain at room temperature.

Placing the sheet 1 for manufacturing a concave-convex pattern on the substrate 5 can be followed by softening the sheet-like member 2. Or, softening the sheet-like member 2 can be followed by placing the sheet 1 for manufacturing a concave-convex pattern on the substrate 5. The concave-convex pattern block 3 of the sheet for manufacturing a concave-convex pattern which is placed on the substrate is compressively bonded onto the substrate via the reverse concave-convex pattern layer 4. The reverse concave-convex pattern layer may be preliminarily formed on the concave-convex pattern block. Alternatively, when compressively bonding the sheet-like member onto the substrate, the reverse concave-convex pattern layer can be formed. Specifically, the concave-convex pattern block is compressively bonded onto the substrate, e.g., via a layer of a plastic material, a heat-curing material, or photo-curing material. An imprint is carried out using the concave-convex pattern block to provide the reverse concave-convex pattern layer.

When the reverse concave-convex pattern layer is preliminarily formed, a sheet for manufacturing a concave-convex pattern with the concave-convex pattern block directly imprinted on the sheet-like member thereof can be employed. When softening the sheet-like member by heating, it is possible also to soften the concave-convex pattern block. Therefore, the reverse concave-convex pattern layer can be easily adapted to steps of the substrate. The cured reverse concave-convex pattern layer is separated at the steps of the substrate, thereby allowing it to transfer the reverse concave-convex pattern layer even at the steps without deformation. The thickness of the reverse concave-convex pattern layer is easily controlled. Therefore, it is possible to prevent defects from arising at the concave-convex pattern formed on the substrate as a result of the excessively thick concaves of the reverse concave-convex pattern layer. In addition, the solid reverse concave-convex pattern layer does not adhere to the substrate and is peeled off easily. Therefore, a position of the sheet for manufacturing a concave-convex pattern is easily aligned with that of the substrate. Air bubbles cannot remain easily between the sheet for manufacturing a concave-convex pattern and the substrate.

On the other hand, just when manufacturing the reverse concave-convex pattern layer at the time of compressively bonding, it is possible to make the reverse concave-convex pattern layer in closely contact with the substrate, thereby allowing it to simplify the process. When compressively bonding the sheet for manufacturing concave-convex pattern onto the substrate, the material of the reverse concave-convex pattern layer can be softened, thereby allowing it to make the reverse concave-convex pattern layer in closely contact with the substrate.

The substrate is not limited in particular if the concave-convex pattern is formed thereon. The substrate can be made of an organic material, an inorganic material, or a composite material including an organic material or an inorganic material. The organic materials for the substrate include polyolefin, polyester, polyamide, polyimide, an epoxy resin, etc. The inorganic substrates include a glass substrate, a carbon substrate, a Si substrate, a substrate including compound semiconductors such as GaP, GaAs, etc., and a ceramic substrate including alumina, silicon nitride, etc.

As the substrate including a composite material of organic and inorganic materials, a fiber-reinforced plastic substrate with an epoxy resin impregnated with the woven cloth thereof is employed.

The shape of the substrate is not particularly limited, and may be a block-like body, such as a cube, a rectangular parallelepiped, a rod-like structure, a ball, etc. The shape of the substrate may be a hollow structure such as a box, a cylinder, etc. Furthermore, the shape of the substrate may be a complicated shape combining the shapes mentioned above. Sheet-formed substrates include a film, a plate and a wafer of various materials. Block-like substrates include, e.g., a lens and a metallic mold made of various materials.

The heating method to soften the sheet-like member 2 is not particularly limited. For example, the sheet-like member can be directly heated. Alternatively, the sheet-like member can be indirectly heated by compressing a hot substrate thereon. The heating and the compressing mentioned above can be carried out separately. Therefore, it is more preferable to heat with a heater prepared separately than to utilize self-heating at the time of compressively bonding the sheet for manufacturing a concave-convex pattern to the substrate.

For heating the sheet-like member or the substrate, it is possible to employ heating by pressing a heated pressure roller or a heated stamp, heating by spraying hot air or gas, infrared heating, induction heating, etc. An infrared absorption pigment, etc. may be added to the sheet-like member so as to easily carry out infrared heating. Noncontact heating is preferably performed without applying pressure to the sheet-like member. Examples of noncontact heating include heating by spraying hot air or gas, infrared heating, and induction heating, etc. A method by pressing a heated pressure roller or a heated stamp employs a soft roller or a soft stamp, e.g., made of an elastomer, thereby preventing the substrate from being damaged owing to the compressing of the roller or stamp thereon at high pressure before sufficiently softening the sheet-like member.

A specific area of the sheet-like member may be selectively softened in an in-plane direction or in a thickness direction. For example, softening an area near the surface of the sheet-like member on the opposite side of the substrate also allows it to inflect the sheet-like member in an opposite direction of the substrate, thereby inducing a self peel-off of the sheet-like member from the substrate at the time of cooling the sheet-like member after compressively bonding the sheet-like member onto the substrate. Furthermore, when directly impressing the concave-convex pattern block onto an area of the sheet-like member, only the area near the concave-convex pattern block can be left without softening the area. Thereby, when the softened sheet-like member adapts to steps, etc. of the substrate, the reverse concave-convex pattern layer is not easily influenced by an in-plane shear stress, thereby allowing it to prevent the concave-convex pattern from deforming. When the adaptiveness to the step etc., of the substrate is taken into consideration, the sheet-like member is desired to have substantially high ductility at least in a thickness direction.

The method of compressing the concave-convex pattern block 3 onto the substrate 5 with the softened sheet-like member 2 is not particularly limited. For example, the substrate and the sheet for manufacturing a concave-convex pattern can be laminated on each other by using a pressure roller. Alternatively, both the substrate and the sheet for manufacturing a concave-convex pattern may be in closely contact with each other by depressurizing air therebetween. In addition, an ultrasonic wave is applied to promote the deformation of the sheet-like member, thereby improving the adhesiveness therebetween at the time of compressing the sheet-like member.

The sheet-like member 2 deforms to flexibly absorb the step 6 of the substrate 5. Then, the concave-convex pattern block 3 and the reverse concave-convex pattern layer 4 can adapt to the surface of the substrate. For this reason, it becomes possible to form a good concave-convex pattern also around the steps of the substrate. Furthermore, it is possible to thin the adhesive layer for bonding the substrate and the concave-convex pattern layer or for bonding the substrate and the reverse concave-convex pattern layer. The thin adhesive layer allows it to transfer a concave-convex pattern corresponding to a thickness distribution of the reverse concave-convex pattern layer onto the substrate with a high contrast by etching.

The softened sheet-like member allows it to isotropically pressurize, thereby preventing stress-focusing on the steps and edges of the substrate at the time of pressurizing. Therefore, the substrate is hard to break. In addition, an elastic recovery at the time of unloading, i.e., finishing the pressurizing does not easily deform or break the concave-convex pattern layer and the reverse concave-convex pattern layer. This is quite different from the flexibly absorbing of the steps due to an elastic deformation of an elastomer.

When the sheet-like member is soft but the concave-convex pattern layer or the reverse concave-convex pattern layer is thick, the sheet-like member would be detached from the concave-convex pattern layer or the reverse concave-convex pattern layer to make it difficult to adapt the sheet-like member to the steps of the substrate. Then, it is difficult to keep the concave-convex pattern or the reverse concave-convex pattern, which is soft to easily deform, over a long time on a soft substance, without deforming the concave-convex pattern.

In this embodiment, since the sheet-like member has flexibility only at the time of compressively bonding, the concave-convex pattern layer or the reverse concave-convex pattern layer is held on the hardened sheet-like member for the rest of the bonding. For this reason, the concave-convex pattern layer or the reverse concave-convex pattern layer does not deform the concave-convex pattern thereof easily. Thinning the concave-convex pattern layer or the reverse concave-convex pattern layer leads to an easy fracture thereof at the steps where a strong shear stress is applied in a direction perpendicular to the surface of the substrate. The concave-convex pattern layer and reverse concave-convex pattern layer are divided by the fracturing thereof into two blocks as shown in FIG. 2 so that the respective two blocks adhere to the upper surface and the lower surface of the step. As a result, the concave-convex pattern is successfully formed without a lack of imprinting even around the step. The softened sheet-like member adheres to the sidewall of the step between the divided two concave-convex pattern layers, or between the divided two reverse concave-convex pattern layers, thereby preventing the concave-convex pattern layer and reverse concave-convex pattern layer from being detached by thermal stresses.

The concave-convex pattern layer or reverse concave-convex pattern layer is continuous in an in-plane direction, and has no spatially closed interface between itself and its surround not like a particle. The spatially closed interface of a particle makes it easy to separate the particle from the surround. For this reason, when the sheet-like member is softened, the softened sheet-like member percolates into the interface between the reverse concave-convex pattern layer and the substrate, thereby producing no risk of fracturing the concave-convex pattern layer or reverse concave-convex pattern layer with its peel-off from the substrate. The softened sheet-like member does not percolate into the interface between the reverse concave-convex pattern layer and the substrate, thereby causing no obstruction of pattern transfer. After compressively bonding, the surface of the substrate is protected by the laminated structure formed by the continuous films, thereby allowing it to effectively prevent the substrate from being damaged by unevenness of the substrate.

The sheet for manufacturing a concave-convex pattern according to the invention is normally disposable for each process, and even the deformation thereof due to adapting to the steps of the substrate causes no problem. Even if dusts enter between the sheet for manufacturing a concave-convex pattern and the substrate, a failure is confined to only the substrate. If an original disk for general nanoimprint lithography includes a failure due to dusts, many defective products are manufactured. However, the manufacturing method according to the invention creates no risk of manufacturing many defective products. The sheet for manufacturing a concave-convex pattern adapts to unevenness due to dusts, thereby allowing it to minimize an area of failure lacking the targeted concave-convex pattern. The manufacturing method according to the invention is effective in fabricating many independent devices on a substrate, e.g., a wafer for manufacturing LEDs, thereby allowing it to increase a yield ratio of the devices.

An original disk for general nanoimprint lithography does not deform so as to adapt to steps of the substrate, and therefore needs a thick adhesive layer to cover the steps of the substrate. The thick adhesive layer makes it difficult to form a concave-convex pattern onto a substrate with a high contrast. The method for manufacturing a concave-convex pattern of this embodiment provides the adaptiveness to steps of a substrate. Therefore, the adhesive layer is not required to be thick, and is not needed at all in some cases.

The concave-convex pattern layer or the reverse concave-convex pattern layer undergoes a plastic deformation over a yielding point or an elastic deformation thereof to adapt to the steps of the substrate. The case of the elastic deformation requires an elastomer in order to make the concave-convex pattern layer or the reverse concave-convex pattern layer. An elastomer allows it to prevent the concave-convex pattern layer or the reverse concave-convex pattern layer from being peeled off from the substrate owing to thermal stresses.

The plastic deformation generates a small elastic recovery at the time of unloading, i.e., finishing the pressurization, thereby preventing peel-off from the steps due to a large elastic recovery. Making the concave-convex pattern layer or the reverse concave-convex pattern layer fracture at step edges of the substrate increases the adaptiveness to the steps of the substrate. That is, making the concave-convex pattern layer and the reverse concave-convex pattern layer adapt the sidewalls of the steps requires both the layers to elongate in an in-plane direction, thereby causing deformations of a concave-convex pattern or peel-off from the substrate.

On the other hand, making the concave-convex pattern layer or the reverse concave-convex pattern layer fracture at step edges of the substrate does not require both the layers to elongate in an in-plane direction, thereby preventing the deformations of the concave-convex pattern. This also allows it to form a concave-convex pattern even just near the steps of the substrate without lacking the concave-convex pattern. Even if dusts are trapped, the lacking of the concave-convex pattern can be confined to an area where the dusts are trapped. Further, the dusts which go through the concave-convex pattern layer and the reverse concave-convex pattern layer are trapped in and fixed to the softened sheet-like member. When the sheet-like member is removed, e.g., by peeling off the sheet-like member after compressive bonding, the dusts trapped in the sheet-like member can be removed together with the sheet-like member.

For example, employing the manufacturing method of the invention for a process for producing LEDs with high brightness allows it to confine a lacking area of the concave-convex pattern to a small area, thereby giving almost no influence on the brightness of LEDs. If dusts remain in a post-processing for forming electrodes, defects arising from the dusts can degrade the reliabilities of LED chips. The method for manufacturing a concave-convex pattern of this embodiment allows it to confine the lack of a concave-convex pattern to the minimum in a manufacturing process of LEDs, thereby greatly reducing an occurrence of failure arising from dusts.

Furthermore, when forming the concave-convex pattern so that the concave-convex pattern block of the sheet for manufacturing a concave-convex pattern gets out of the outermost circumference of the substrate, the concave-convex pattern layer or the reverse concave-convex pattern layer fractures at the outermost edge of the substrate, thereby making it easy to peel off the sheet-like member. This is explained further with reference to FIGS. 20 to 23.

Figure 20:
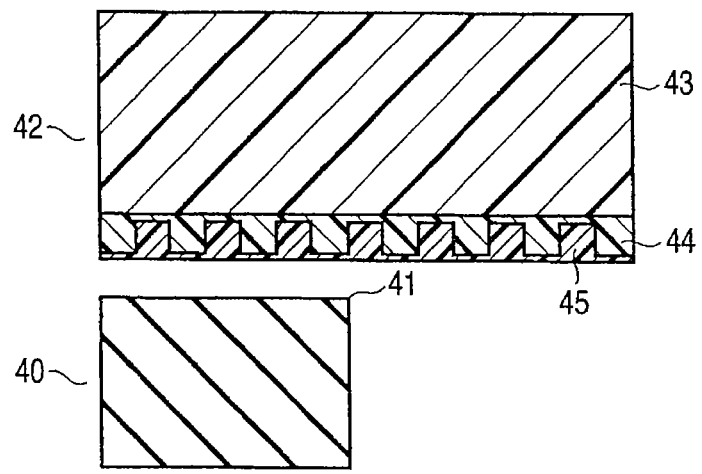
FIG. 20 is a sectional view showing a step of compressively bonding and peeling off.
Figure 21:
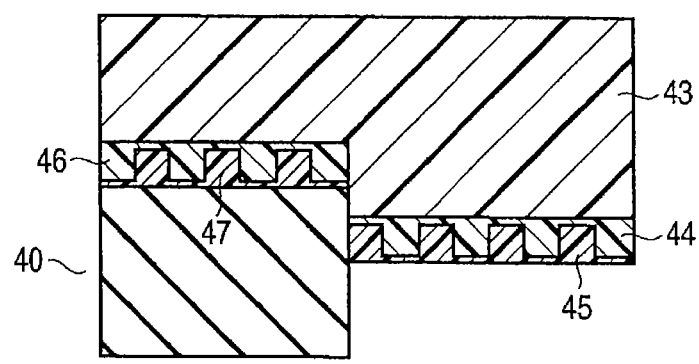
FIG. 21 is a sectional view showing a step in the method following FIG. 20.
Figure 22:
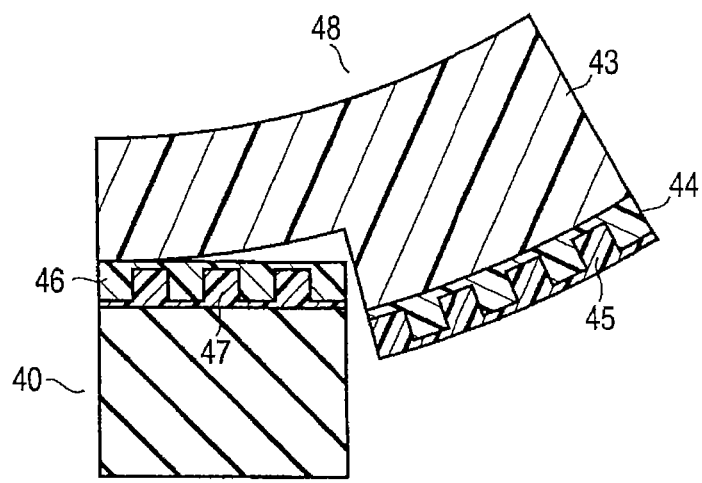
FIG. 22 is a sectional view showing a step in the method following FIG. 21.
Figure 23:
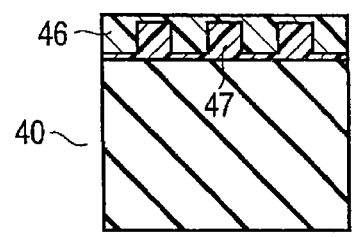
FIG. 23 is a sectional view showing a step in the method following FIG. 22.

As shown in FIG. 20, the sheet 42 for manufacturing a concave-convex pattern with the concave-convex pattern layer 44 and the reverse concave-convex pattern layer 45 formed on the sheet-like member 43 is placed on the substrate to compress. The concave-convex pattern layer 44 and the reverse concave-convex pattern layer 45 are broken at the outermost step edge 41 of the substrate 40, as shown in FIG. 21. Then, as shown in FIG. 22, the sheet 42 for manufacturing a concave-convex pattern is peeled off from the substrate by grasping a portion of the sheet 42 having got out of the substrate 40 as if flicking up the portion. In FIG. 22, the reference numeral 48 denotes the sheet for manufacturing a concave-convex pattern just being peeled off. As shown in FIG. 23, the sheet 48 for manufacturing a concave-convex pattern can be peeled off while leaving the concave-convex pattern layer 46 and the reverse concave-convex pattern layer 47 compressively bonded onto the substrate 40 thereon.

Figure 24:
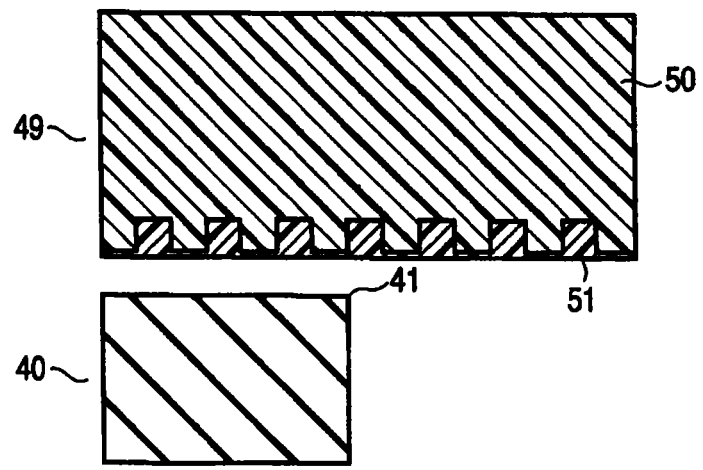
FIG. 24 is a sectional view showing a step of compressively bonding and peeling off.
Figure 25:
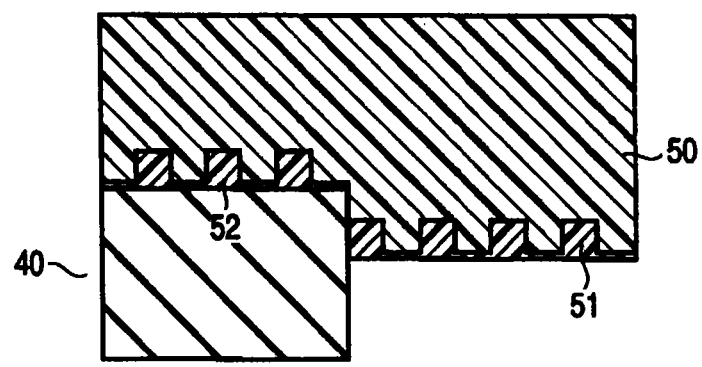
FIG. 25 is a sectional view showing a step in the method following FIG. 24.
Figure 26:
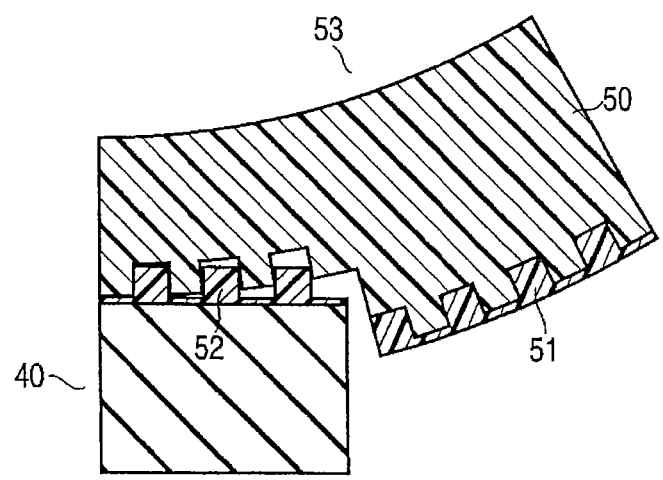
FIG. 26 is a sectional view showing a step in the method following FIG. 25.
Figure 27:
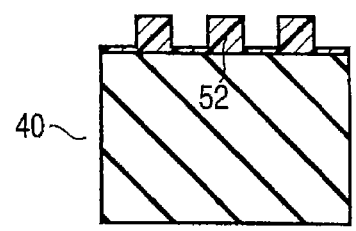
FIG. 27 is a sectional view showing a step in the method following FIG. 26.

As shown in FIG. 24, the same process as the above-mentioned is carried out when using the sheet 49 for manufacturing a concave-convex pattern with the concave-convex pattern block stamped directly on the sheet-like member 50. When this sheet 49 for manufacturing a concave-convex pattern is compressed onto the substrate 40, the reverse concave-convex pattern layer 51 is broken at the outermost step edge 41 of the substrate 40 as shown in FIG. 25. Then, as shown in FIG. 26, the sheet 49 for manufacturing a concave-convex pattern is peeled off from the substrate by grasping a part of the sheet 49 protruded over the substrate 40 as if flicking up the part. In FIG. 26, the reference numeral 53 denotes the sheet for manufacturing a concave-convex pattern which is just being peeled off. As shown in FIG. 27, the sheet 53 for manufacturing a concave-convex pattern can be peeled off while leaving the reverse concave-convex pattern layer 52 compressively bonded onto the substrate 40 thereon.

Figure 28:
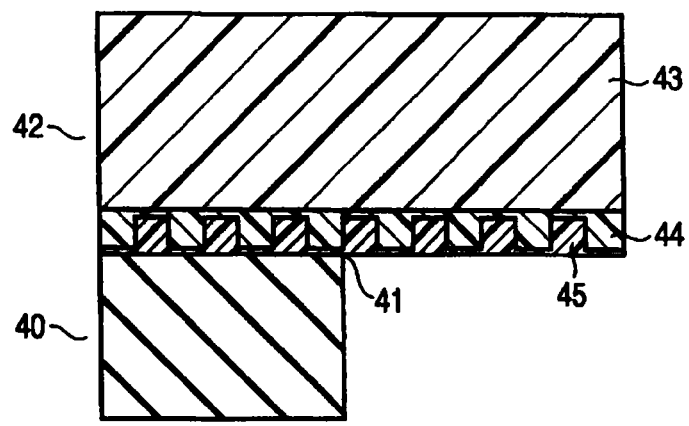
FIG. 28 is a sectional view showing a step of peeling off.
Figure 29:
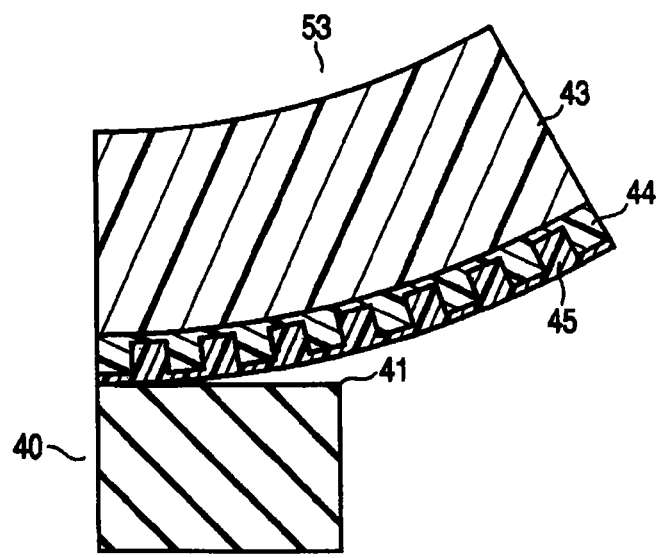
FIG. 29 is a sectional view showing a step in the method following FIG. 28.
Figure 30:
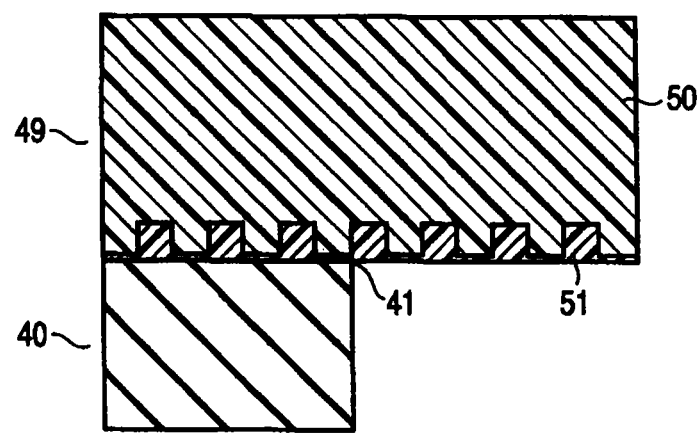
FIG. 30 is a sectional view showing a step of peeling off.
Figure 31:
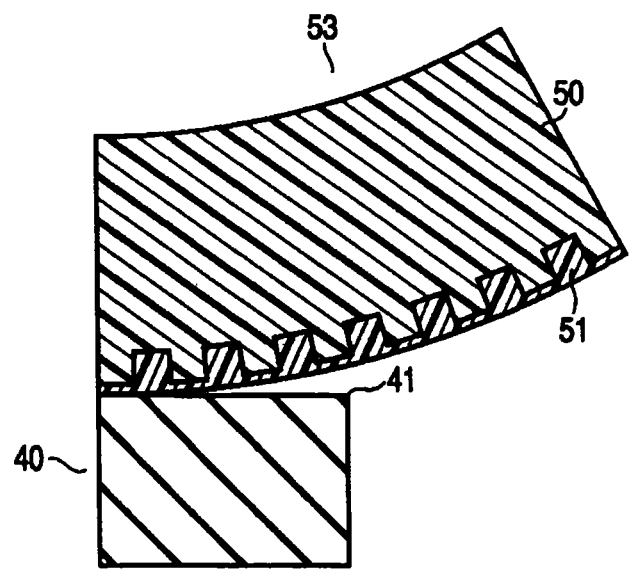
FIG. 31 is a sectional view showing a step in the method following FIG. 30.

As shown in FIGS. 28 and 29, when bonding the sheet 42 for manufacturing a concave-convex pattern, the concave-convex pattern layer 44 and the reverse concave-convex pattern layer 45 are not broken at the outermost step edge 41 of the substrate 40. In such a case, when peeling off the sheet 53 for manufacturing a concave-convex pattern, as shown in FIG. 29, the concave-convex pattern layer 44 and the reverse concave-convex pattern layer 45 are also easily peeled off from the substrate 40 together with the sheet-like member 43. In the same way, as shown in FIGS. 30 and 31, when the concave-convex pattern block is directly stamped on the sheet-like member 50 of the sheet 49 for manufacturing a concave-convex pattern, the reverse concave-convex pattern layer 51 is easily peeled off together with the sheet-like member 50.

Thus, making the concave-convex pattern layer or the reverse concave-convex pattern layer fracture at the outermost step edge of the substrate makes it easy to peel off the sheet-like member. Obviously, it is possible to make the concave-convex pattern layer or the reverse concave-convex pattern layer fracture by elastically deforming the sheet-like member. However, in such a case, a high pressure is needed at the time of compressively bonding the sheet for manufacturing a concave-convex pattern, thereby creating a risk of damaging the original disk or the substrate. In addition, the concave-convex pattern layer or the reverse concave-convex pattern layer fractures by an addition of a tensile stress in an in-plane direction, thereby yielding a disordered fracture edge. That is, the fracture edge is not smooth but coarse. As a result of the disordered fracture edge, the sheet for manufacturing a concave-convex pattern easily fractures from the fracture edge thereof and is therefore not easily peeled off.

On the contrary, according to this embodiment, the sheet-like member softens to deform, thereby making the concave-convex pattern layer or the reverse concave-convex pattern layer fracture dominantly owing to a shear stress acting in the thickness direction thereof. This shear stress concentrically acts on the outermost step edge of the substrate. Therefore, the fracture edge is not easily disordered, thereby making it difficult to generate cracks in the sheet for manufacturing a concave-convex pattern at the time of peeling off.

An adhesive layer can be provided between the substrate and the reverse concave-convex pattern layer. The adhesive layer can be provided, for example, to the sheet for manufacturing a concave-convex pattern. Or, the reverse concave-convex pattern layer can also be compressively bonded to the adhesive layer formed on the substrate. A material of the adhesive layer is not particularly limited, and well-known adhesive agents and adhesives are employed. The adhesive layer should be characteristically as follows. That is, the adhesive layer does not easily attract dusts, and is softened by heating for softening the sheet-like member, thereby improving the adhesiveness between the reverse concave-convex pattern layer and the substrate. A B-Stage resin and a thermoplastic resin, etc. are preferably employed for the adhesive layer.

A thickness of the adhesive layer is not particularly limited, but the adhesive layer preferably has a sufficient thickness to prove an adhesive strength for the sheet for manufacturing a concave-convex pattern. The thickness is preferably not less than 0.02 μm and not more than 1 μm. More preferably, the thickness is not less than 0.05 μm and not more than 0.5 μm. When the adhesive layer is too thin, the adhesive strength thereof is not sufficient. On the other hand, when the adhesive layer is too thick, it will become difficult to etch the substrate surface.

The material of the adhesive layer is not particularly limited, but is preferably selected from the view point of the etching characteristic for the concave-convex pattern layer or the reverse concave-convex pattern layer. For example, when the concave-convex pattern layer or the reverse concave-convex pattern layer contains a metallic element or a metalloid element, it is preferable to employ an adhesive layer that can be etched fast under an etching condition for transferring a concave-convex pattern onto the substrate. Specifically, the material is preferably an organic polymer which substantially contains neither a metallic element nor a metalloid element. Examples of the organic polymer include polystyrene derivatives such as poly-α-methylstyrene, an acrylic resin and its derivatives, an epoxy resin, a phenol resin and its derivatives, etc. Hot melt coating resins, such as a ethylene-acetic acid vinyl system, a polyurethane system, a polyolefin system, and a polyamide system, may be employed.

On the other hand, when using the adhesive layer as a pattern transfer layer for once transferring the pattern of the concave-convex pattern layer or the reverse concave-convex pattern layer, the adhesive layer needs an etching resistance. That is, the adhesive layer preferably has a sufficient etching resistance under an etching condition at the time of transferring the concave-convex pattern onto the substrate. Specifically, materials containing a metallic element or metalloid element, etc. are preferable, and therefore, for example, a silicone resin, a spin-on glass with a reflowing performance, etc. are preferably employed.

An adhesive layer may be disposed between the reverse concave-convex pattern layer and the sheet-like member. Generally, an adhesion interface is very suitable for peel off from the ends of the interface as a result of a peeling stress. That is, the peel-off starts easily from the ends or the steps of the substrate. However, the adhesive layer placed between the reverse concave-convex pattern layer and the substrate is thickened in order to prove the adhesive strength, thereby making it difficult to form a concave-convex pattern on the substrate with a high contrast.

If the adhesive layer is disposed behind the reverse concave-convex pattern layer, the reverse concave-convex pattern layer breaks at the ends or the steps of the substrate at the time of compressing the sheet for manufacturing a concave-convex patter onto the substrate, thereby causing an exposure of the adhesive layer from behind the reverse concave-convex pattern layer. When the exposed adhesive layer adheres to the substrate, the peel-off can be suppressed effectively between the sheet for manufacturing a concave-convex pattern and the substrate. In addition, if the adhesive layer is removed by, e.g., oxygen plasma ashing etc., this adhesive layer has no influence when etching the surface of the substrate.

The adhesive layer may double as a buffer layer absorbing steps of the substrate. Since the sheet-like member mainly absorbs the steps of the substrate also in this case, it is not necessary to make the adhesive layer thicker than needed. For this reason, if the sheet-like member is peeled off to be removed, the adhesive layer can be easily removed without trace by oxygen plasma ashing. That is, the sheet-like member and the adhesive layer can share functions for both absorbing the steps of the substrate and bonding the sheet-like member to the ends or steps of substrate. As a result, it becomes possible to easily remove the sheet-like member or the adhesive layer, and, in addition, to prevent the peel-off of the sheet-like member from the substrate.

If dusts exist, the dusts pass through the reverse concave-convex pattern layer, and are involved into the adhesive layer to be fixed to the adhesive layer. Then, the adhesive layer is peeled off together with the sheet-like member, thereby allowing it to remove the dusts together therewith. In order to make it easy to peel off, it is preferable to employ an adhesive agent to easily peel off from the interface on the side of the reverse concave-convex pattern layer while the adhesive agent bonds the sheet-like member with the substrate or the dusts strongly.

In order to improve the adaptiveness of the reverse concave-convex pattern layer to the steps of the substrate, it is preferable that the adhesive layer includes thermoplastics, a B-stage resin, etc which can be softened as well as the sheet-like member. A glass transition temperature of the resin to be used is preferably comparable to that of the sheet-like member. An organic polymer material which contains substantially neither a metallic element nor a metalloid element is preferable, because the organic polymer material can be easily removed by oxygen plasma ashing, etc. For example, polystyrene derivatives, such as poly-a-methylstyrene, an acrylic resin and its derivatives, an epoxy resin/phenol resin and their derivatives, etc. are also employed. Resins for hot melt coating such as an ethylene-acetic acid vinyl system, a polyurethane system, a polyolefin system, and a polyamide system may be employed.

A thickness of the adhesive layer is not particularly limited, but the adhesive layer is made to have a thickness to prove a sufficient adhesive strength to the substrate surface. The thickness of the adhesive layer is preferably not less than about 0.05 μm and not more than about 5 μm. More preferably, the thickness is not less than about 1 μm and not more than about 3 μm. If the adhesive layer is too thin, the adhesive strength with the substrate is inadequate. On the other hand, if the adhesive layer is too thick, the adhesive layer will become difficult to remove by etching etc.

The adhesive layer is disposed between the reverse concave-convex pattern layer and the sheet-like member, and is preferably between the concave-convex pattern layer and the sheet-like member. In this case, in order to easily peel off the sheet-like member, a peeling layer is preferably formed between the concave-convex pattern layer and the adhesive layer, or between the adhesive layer and the sheet-like member.

Figure 3:
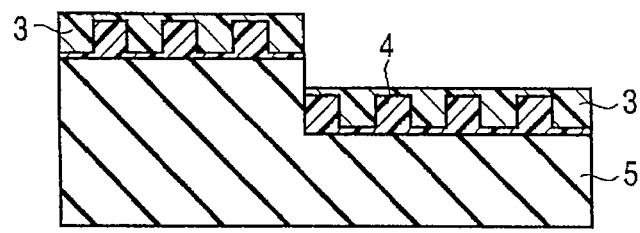
FIG. 3 is a sectional view showing a step in the method following FIG. 2.

Compressing the concave-convex pattern block onto the substrate 5 is followed by removing the carrier sheet, the sheet-like member 2, etc. of the sheet 1 for manufacturing a concave-convex pattern. Further, the reverse concave-convex pattern layer 4 is transferred onto the substrate 5, as shown in FIG. 3. A method of removing the carrier sheet and the sheet-like member is not particularly limited. The carrier sheet and the sheet-like member may be simply peeled off, or may be eluted with a solvent. When peeling off, a peeling layer is preferably formed between the carrier sheet and the sheet-like member, or between the sheet-like member and the reverse concave-convex pattern layer.

When softening the sheet-like member, there is a risk that the sheet-like member is bonded to the adjacent layer like a hot melt adhesive agent. In order to avoid the risk, it is preferable to provide a peeling layer between the sheet-like member and the adjacent layer thereto. The material for the peeling layer preferably has a higher glass transition temperature or a higher melting point, if the material has no glass transition temperature, than the sheet-like member. When softening the sheet-like member, the peeling layer softens simultaneously to create a risk that the peeling performance decline. Materials for the peeling layer include organic polymer materials such as a silicone resin and a fluorine resin, oxides such as silica or alumina, carbons such as diamond like carbon etc., and metal such as aluminum. A method of manufacturing the peeling layer is not particularly limited, but can suitably use publicly known techniques, such as a coating method, an electroplating method, a sputtering method, and a vacuum deposition method.

A thickness of the peeling layer is not particularly limited, and may be a monomolecular layer to prove a peel property. Generally, the thickness of the peeling layer is not less than about 1 nm and not more than about 100 nm, and is more preferably not less than about 5 nm and not more than about 20 nm. If the peeling layer is too thin, there is a risk that the peel property thereof may become inhomogeneous. On the other hand, if the peeling layer is too thick, the peeling layer becomes difficult to remove by etching etc.

A gas-forming layer may be used instead of the peeling layer. A gas may be formed with light irradiation or heating, and the carrier sheet or the sheet-like member undergoes a self peel-off due to the formed gas.

As the gas-forming layer, substances containing an azide compound, etc. is preferable, and the sheet-like member may double as a gas-forming layer.

It is preferable to employ a water-soluble polymer for materials of the carrier sheet and the sheet-like member in order to elute the carrier sheet and the sheet-like member. Examples of the water-soluble polymer include polyvinyl alcohol and its derivatives, and cellulose ether. In order to improve the flexibility or softening due to heating for the water-soluble polymer, a plasticizer may be added to the carrier sheet or the sheet-like member. Examples of the plasticizer include kinds of polyalcohol, such as pentaerythritol, sorbitol, mannitol, glycerin, ethylene glycol, and a polyethylene glycol, etc.

The carrier sheet can be removed by a wet etching method or a dry etching method. For example, carrier sheets of Al or Cu can be removed by a wet etching with acids. The carrier sheet is difficult to remove at the same time as removing the reverse concave-convex pattern layer or the sheet-like member. Therefore, the carrier sheet is preferably removed by a dry etching method. A reactive ion etching method using an oxygen-mixed gas is preferable as the dry etching method. When using the oxygen-mixed gas, it is advantageous to use the carrier sheet or the sheet-like member made of an organic polymer. The carrier sheet and the sheet-like member made of an organic polymer are easily etched, because both the sheet and the member do not substantially include metallic elements or metalloid elements.

As mentioned above, the reverse concave-convex pattern layer transferred onto the substrate is continuous in an in-plane direction, thereby causing no dust due to broken pieces.

An anti-etching layer can also be provided between the sheet-like member and the reverse concave-convex pattern layer. The anti-etching layer once stops a progress of etching, thereby making it difficult to cause nonuniformity of etching. Removing the sheet-like member by etching is followed by removing the anti-etching layer by etching with changing etching conditions. The anti-etching layer can be disposed also between the carrier sheet and the sheet-like member. The anti-etching layer and the reverse concave-convex pattern layer are in close proximity to each other to reduce nonuniformity of etching. Therefore, it is preferable to dispose the anti-etching layer between the sheet-like member and the reverse concave-convex pattern layer. A sidewall-transferring layer to be mentioned later may double as the anti-etching layer.

Materials of the anti-etching layer preferably include substances which contain metallic elements or metalloid elements to have a resistance to reactive ion etching. The substances which contain at least one of Si and Al are preferable, and include, e.g., silica, alumina, and aluminum. The anti-etching layer including silica, alumina, or aluminum can be easily formed, for example by sputtering or vacuum deposition. The anti-etching layer including silica can be formed by applying silica precursors, e.g., polysilazane using a sol gel method.

A thickness of the anti-etching layer is not particularly limited, but is preferably not less than about 1 nm and not more than about 100 nm. More preferably, the thickness thereof is not less than about 5 nm and not more than about 20 nm. If the anti-etching layer is too thin, the effect for stopping etching is not sufficient, thereby causing nonuniformity of etching easily. On the other hand, if the anti-etching layer is too thick, it becomes difficult to remove the anti-etching layer by etching.

Figure 4:
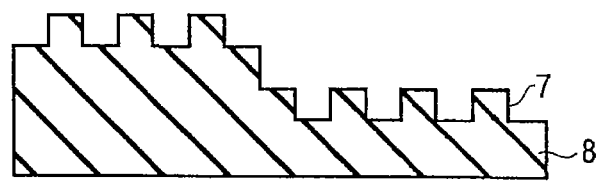
FIG. 4 is a sectional view showing a step in the method following FIG. 3.

The transferred reverse concave-convex pattern layer 4 is used as an etching mask. Then, as shown in FIG. 4, the concave-convex pattern 7 corresponding to a thickness distribution of the reverse concave-convex pattern layer 4 is transferred onto the surface of the substrate 5 by an etching processing. The etching processing is not particularly limited, but well-known dry etching methods or wet etching methods are employed for processing.

Figure 5:
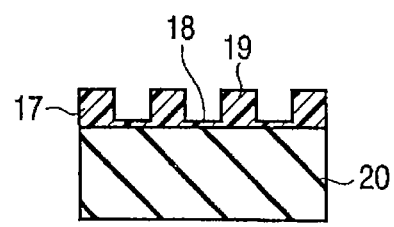
FIG. 5 is a sectional view showing a step in the method following FIG. 4.
Figure 6:
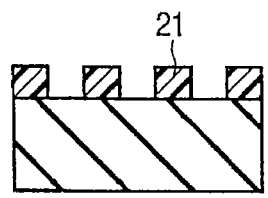
FIG. 6 is a sectional view showing a step in the method following FIG. 5.
Figure 7:
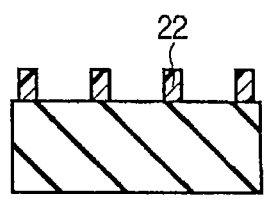
FIG. 7 is a sectional view showing a step in the method following FIG. 6.

An example of an etching process is shown in FIGS. 5 to 8. Here, the substrate is processed by anisotropic dry etching. The reverse concave-convex pattern layer 17 including continuous concaves 18 and convexes 19 is formed on the substrate 20 as shown in FIG. 5. At first, the anisotropic dry etching removes the concaves 18 of the reverse concave-convex pattern layer 17, as shown in FIG. 6. Then, as shown in FIG. 7, a shape, e.g., a dot diameter etc. of the remained convexes 21 can be trimmed by dry or wet isotropic etching. In addition to the dot diameter, a taper angle of a sidewall of the convexes 21 can be also controlled, and the convexes 21 can be rounded like a dome.

Figure 8:
FIG. 8 is a sectional view showing a step in the method following FIG. 7.

The convexes 22 with their shape trimmed are used as an etching mask to etch the substrate 20 including the basic adhesive layer by anisotropic etching. As a result, the convexoconcave 23 reflecting the concave-convex shape of the reverse concave-convex pattern layer 17 is formed on the substrate surface, as shown in FIG. 8. It is preferable to employ a material with metallic or metalloid elements added, which has an excellent etching resistance, for the reverse concave-convex pattern layer.

When the reverse concave-convex pattern layer contains substantially neither a metallic element nor metalloid element, it is preferable to dispose a pattern transfer layer between the reverse concave-convex pattern layer and the substrate. The pattern transfer layer is preferably disposed, e.g., between the reverse concave-convex pattern layer and the adhesive layer, or between the adhesive layer and the substrate. The pattern transfer layer is processed by using the reverse concave-convex pattern layer as an etching mask. Then, the substrate is etched using the processed pattern transfer layer as a hard mask. Oxides, such as silica, alumina and chromic oxide, nitrides, e.g., silicon nitride, metals such as Al, Cr, Mo, etc., silicide compound, e.g., molybdenum silicide may be selected as publicly known materials for a hard mask when the etching selectivity thereof is taken into consideration. A thickness of the pattern transfer layer is not particularly limited. The thickness is preferably not less than about 5 nm and not more than about 100 nm. More preferably, the thickness is not less than about 10 nm and not more than about 50 nm. If the pattern transfer layer is too thin, there is a risk that the pattern transfer layer does not serve as a hard mask. On the other hand, if the pattern transfer layer is too thick, the pattern transfer layer becomes difficult to remove by etching etc. after pattern transfer.

Figure 9:
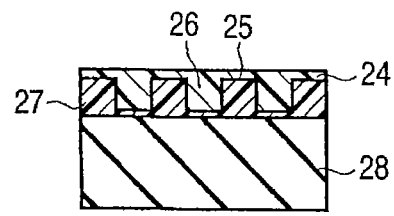
FIG. 9 is a sectional view showing a step in the method following FIG. 8.

When the concave-convex pattern layer contains a metallic element or a metalloid element, the substrate can be etched according to the processes as shown in FIGS. 9 to 12. As shown in FIG. 9, the concave-convex pattern layer 24 is provided on the substrate 28 via the reverse concave-convex pattern layer 27. The concave-convex pattern layer 24 includes concaves 25 and convexes 26 containing a metallic element or a metalloid element. The reverse concave-convex pattern layer 27 includes a carbon-system material containing organic substances, and includes substantially neither a metallic element nor a metalloid element.

Figure 10:
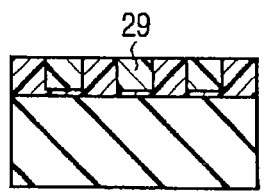
FIG. 10 is a sectional view showing a step in the method following FIG. 9.
Figure 11:
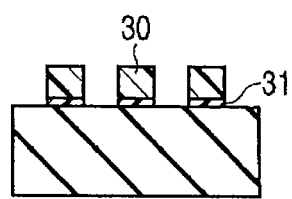
FIG. 11 is a sectional view showing a step in the method following FIG. 10.

First, anisotropic dry etching removes the concaves 25 of the concave-convex pattern layer 24, as shown in FIG. 10. The convexes of the reverse concave-convex pattern layer 27 is etched to remove by dry etching of oxygen system using the left convexes 29 of the concave-convex pattern layer 24 as an etching mask, as shown in FIG. 11.

Figure 12:
FIG. 12 is a sectional view showing a step in the method following FIG. 11.

The substrate 28 is selectively exposed to obtain an etching mask including a laminated layer of the concaves of the reverse concave-convex pattern 27 and the convexes 29 of the concave-convex pattern layer. As shown in FIG. 12, the substrate is etched by anisotropic etching using this etching mask. Before etching the substrate, a size or a shape of the left convexes of the concave-convex pattern layer can also be trimmed by isotropic etching, etc.

A sidewall-transfer layer with an excellent etching resistance may be disposed at the interface between the concave-convex pattern layer and the reverse concave-convex pattern layer. The convexes of the reverse concave-convex pattern layer have a shape with its sidewall perpendicular to an in-plane direction. A concave-convex pattern reflecting an edge shape of the convexes of the reverse concave-convex pattern layer can be formed using this sidewall-transfer layer and a technique similar to a publicly known sidewall-transfer process, as shown in FIGS. 13 to 17.

Figure 13:
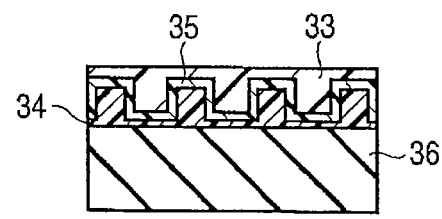
FIG. 13 is a sectional view showing a step in the method following FIG. 12.
Figure 14:
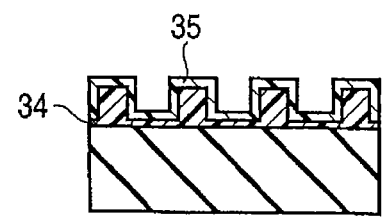
FIG. 14 is a sectional view showing a step in the method following FIG. 13.

A concave-convex pattern layer 33 is formed on the substrate 36 via the reverse concave-convex pattern layer 34 and the sidewall-transfer layer 35, as shown in FIG. 13. The concave-convex pattern layer 33 and the reverse concave-convex pattern layer 34 include a carbon-system material containing organic substances, and include substantially neither a metallic element nor a metalloid element. On the other hand, the sidewall-transfer layer 35 includes a metallic element or a metalloid element. The concave-convex pattern layer 33 is removed by dry etching of oxygen system, as shown in FIG. 14, thereby exposing the sidewall-transfer layer 35 fitting to the concave-convex shape of the reverse concave-convex pattern layer 34.

Figure 15:
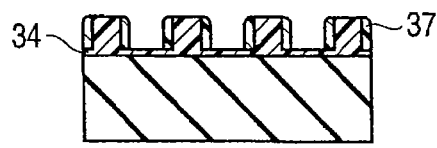
FIG. 15 is a sectional view showing a step in the method following FIG. 14.
Figure 16:
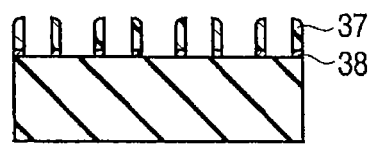
FIG. 16 is a sectional view showing a step in the method following FIG. 15.
Figure 17:
FIG. 17 is a sectional view showing t a step in the method following FIG. 16.

Then, the sidewall-transfer layer 35 is selectively removed by anisotropic dry etching to expose the concaves and convexes of the reverse concave-convex pattern layer 34, as shown in FIG. 15. The sidewall-transfer layer 35 is selectively left on the sidewall of the reverse concave-convex pattern layer 34, i.e., an area substantially perpendicular to an in-plane direction. As shown in FIG. 16, the anisotropic etching removes the convexes of the reverse concave-convex pattern layer 34, thereby exposing the substrate 36. An etching mask including a laminated layer of the concaves 38 of the reverse concave-convex pattern 34 and the sidewall 37 left thereon. The substrate is etched using this etching mask, as shown in FIG. 17. The concave-convex pattern 39 has a narrower pitch than the concave-convex pattern of the reverse concave-convex pattern layer 34, and a smaller size or smaller variations than the concave-convex pattern of the reverse concave-convex pattern layer 34.

Second Embodiment

Figure 18:
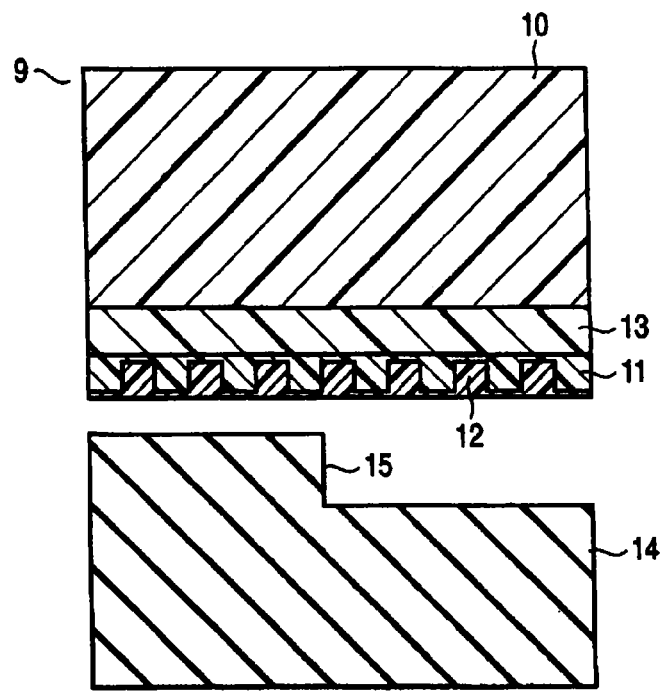
FIG. 18 is a sectional view showing a step in a method for manufacturing a concave-convex pattern using a sheet for manufacturing a concave-convex according to an embodiment.
Figure 19:
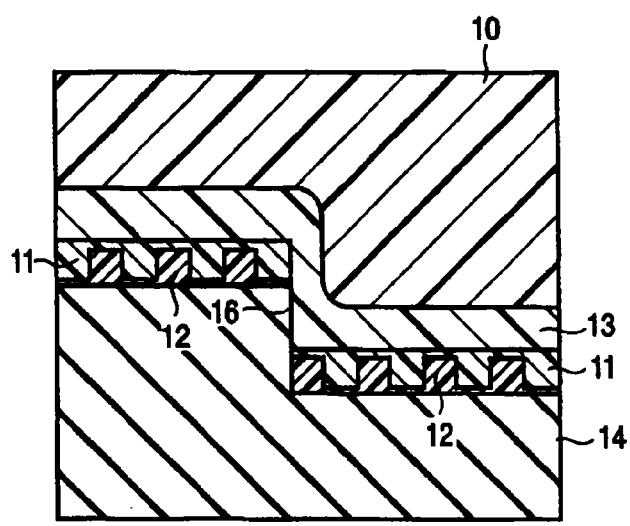
FIG. 19 is a sectional view showing a step in the method following FIG. 18.

A sheet for manufacturing a concave-convex pattern according to a second embodiment is explained with reference to FIGS. 18 and 19. The "sheet" means a two-dimensionally spreading body including a film and a plate in this embodiment.

The sheet for manufacturing a concave-convex pattern of this embodiment can be employed for a method for manufacturing a concave-convex pattern and a similar method for the same. That is, the method for manufacturing concave-convex pattern including the following steps:

preparing the substrate on which the concave-convex pattern is formed;

heating to soften the sheet-like member having a concave-convex pattern block with two or more convexes. The two or more convexes are continuously provided via concaves on at least one of surfaces of the sheet-like member;

(Here, the "surface" is either one of the upper and lower surfaces of the sheet-like member principally parallel to the substrate.)

fitting the reverse concave-convex pattern layer disposed between the sheet-like member and the substrate at least partially to the concave-convex pattern block;

compressively bonding the concave-convex pattern block to the substrate via the reversal concave-convex pattern layer with two or more concaves of the concave-convex pattern block;

removing the sheet-like member to leave at least the reversal concave-convex pattern layer on the substrate after the compressively bonding; and transferring the concave-convex pattern corresponding to a thickness distribution of the reversal concave-convex pattern layer onto the surface of the substrate by etching using the etching mask having a thickness equivalent to the distance from the surface of the substrate to the upper surface of the reversal concave-convex pattern layer after removing the sheet-like member.

The sheet-like member 10 includes thermoplastics, and the concave-convex pattern layer 11 is formed on at least one surface of the sheet-like member. The reverse concave-convex pattern layer 12 with the concave-convex pattern partially fitted to the concave-convex pattern layer 11 is provided. At least one of the concave-convex pattern layer 11 and the reverse concave-convex pattern layer 12 includes a metallic element or a metalloid element.

The adhesive layer 13 including thermoplastics or a B-stage resin may be disposed between the sheet-like member 10 and the concave-convex pattern layer 11. The surface of the sheet for manufacturing a concave-convex pattern for compressively bonding onto the substrate can also be covered with a protective sheet. The protective sheet is peeled off to remove before compressively bonding the sheet for manufacturing a concave-convex pattern onto the substrate. The carrier sheet can also be laminated on the other side of a surface on which the concave-convex pattern layer of the sheet-like member was formed. This is to improve a performance of the carrier sheet to carry the sheet for manufacturing a concave-convex pattern.

The concave-convex pattern layer 11 may be formed over the whole surface of the sheet for manufacturing a concave-convex pattern, and may be formed only on a confined area of the sheet for manufacturing a concave-convex pattern. If there is a blank space lacking the concave-convex pattern layer, it becomes easy to remove the carrier sheet, etc. by picking the blank space. The concave-convex pattern layer is placed on the substrate so that the concave-convex pattern layer is within the outermost circumference of the substrate, thereby making it difficult to peel off the transferred reverse concave-convex pattern layer from the substrate at the time of peeling off the sheet-like member by picking the blank space. Furthermore, kinds of pattern shape of the concave-convex pattern layer are not limited to only one. Two or more kinds of pattern shape may be formed on a single sheet for manufacturing a concave-convex pattern.

Publicly known techniques, such as nanoimprint lithography and optical lithography, are employed to manufacture the concave-convex pattern layer. For example, a material can be poured onto a template having a concave-convex pattern to form the concave-convex pattern by casting.

A two-dimensional shape of the sheet for manufacturing a concave-convex pattern is not particularly limited in a longitudinal direction of the sheet. A belt-like sheet, a rectangular one or a disk-like one can be employed for the sheet. The belt-like sheet is suitable for carrying by a roll-to-roll method. The rectangular sheet and the disk-like sheet are suitable for placing each sheet on every substrate, e.g., a wafer. In the case of the belt-like sheet, a continuous coating is employed for a rapid forming of the reverse concave-convex pattern layer, the adhesive layer, etc.

On the other hand, the rectangular sheet and the disk-like sheet, etc. are excellent in easily preparing a thin film with a well-controlled thickness of tens of nm by spin coating. When a rectangular sheet or a disk-like sheet is employed for the sheet for manufacturing a concave-convex pattern, two or more sheets for manufacturing a concave-convex pattern can be connected with each other by a carrier sheet.

The sheet-like member includes thermoplastics, and is softened by heating to absorb steps of the substrate, thereby allowing it to make the concave-convex pattern layer or the reverse concave-convex pattern layer fit to the surface of the substrate. Thereby, a concave-convex pattern can be formed well even on steps of the substrate. It is also possible to thin an adhesive layer for bonding the substrate and the concave-convex pattern layer, or for bonding the substrate and the reverse concave-convex pattern layer. When the adhesive layer is thin, it is possible to transfer a concave-convex pattern corresponding to a thickness distribution of the reverse concave-convex pattern layer onto the substrate with a high contrast by etching.

The softened sheet-like member allows it to isotropically press, thereby preventing stress-focusing at steps or edges of the substrate at the time of pressing to hardly break the substrate. In addition, the softened sheet-like member is different from an elastomer to elastically absorb steps or edges of the substrate, thereby making it difficult to deform or damage the concave-convex pattern layer or the reverse concave-convex pattern layer as a result of an elastic recovery taking place at the time of unloading.

The sheet-like member can be selectively softened only at the time of compressively bonding. Therefore, the concave-convex pattern layer or the reverse concave-convex pattern layer are usually held on the solid sheet-like member, thereby making it difficult to deform a concave-convex pattern of the concave-convex pattern layer or the reverse concave-convex pattern layer at the time of unloading.

A material of the sheet-like member is particularly limited if including thermoplastics. The sheet-like member is removed in a post-processing. Organic polymer materials which contain many oxygen atoms without S1, AL, etc. are easy to remove by oxygen dry etching, and therefore preferable.

Examples of the organic polymer materials include the followings:
  polyvinyl, such as polyvinyl alcohol, polyaceticacid vinyl, and polyvinyl chloride;
  cellulose ether;
  polyalkylene oxide, such as polyethylene oxide and polypropylene oxide;
  polyolefin, such as polyethylene and polypropylene;
  polystyrene derivatives, such as polystyrene and poly α-methylstyrene;
  acrylic resin and its derivatives;
  polyester, such as polyethylene terephthalate; and
  polycarbonate.

The examples can include copolymers of the above-mentioned materials, such as an ABS resin, an AS resin, etc. A plasticizer, an antioxidant, an ultraviolet absorber, an antiblocking agent, a slip agent, a coloring agent, an antistatic agent, etc. can also be added to the organic polymer material.

The materials for the sheet-like member include water-soluble polymers, such as polyvinyl alcohol and its derivatives, and kinds of cellulose ether. The sheet-like member including such a water-soluble polymer is easily removed by eluting into water. A plasticizer can also be added in order to improve a flexibility of the water-soluble polymer, and the softening thereof at the time of heating. Examples of the plasticizer include kinds of polyalcohol, such as pentaerythritol, sorbitol, mannitol, glycerin, ethylene glycol, and a polyethylene glycol, etc.

As the sheet-like member, thermoplastic elastomers, such as a styrene system, an olefin system, a polyvinyl chloride system, a urethane system, an ester system, and an amide system, may be employed. The residual stress resulting from thermal expansion and contraction, etc. can prevent the reverse concave-convex pattern layer from being peeled off from the substrate.

The sheet-like member can also be combined with a reinforcement member in order to increase the tensile strength and dimensional stability thereof in an in-plane direction thereof. The suppression of thermal expansion and contraction reduces a residual stress resulting from the difference between the thermal expansion coefficients of the substrate and the sheet for manufacturing a concave-convex pattern.

Fine particles such as silica, a glass fiber, a mesh including a glass fiber, a woven cloth, and a nonwoven cloth can be employed for the reinforcement member. Since the adaptiveness of the sheet-like member to steps of the substrate easily decreases at the time of combining with such a reinforcement member, the sheet-like member is preferably thicker than the sheet-like member without the reinforcement member. For example, when using a mesh or a woven cloth, the sheet-like member is preferably as thick as the mesh or the woven cloth.

The sheet for manufacturing a concave-convex pattern undergoes elongation due to the tensile stress at the time of being carried by a roll-to-roll method, etc. in some cases. A carrier sheet with a high tensile strength is preferably used in combination with the sheet for manufacturing a concave-convex pattern in order to avoid the elongation. When a layer including the thermoplastic elastomer is applied between the carrier sheet and the reverse concave-convex pattern layer, the reverse concave-convex pattern layer will not peel from the substrate owing to a residual stress of the carrier sheet.

This carrier sheet serves as a supporting member, and maintains a tensile strength of the sheet for manufacturing a concave-convex pattern. It is preferable that a glass transition temperature of the carrier sheet is higher than that of the sheet-like member in order to maintain a sufficient tensile strength of the sheet-like member even at the time of heating to soften. The glass transition temperature of the carrier sheet is preferably higher than that of the sheet-like member by 5° C. or more, and more preferably by 10° C. or more. When the glass transition temperatures of these members are close to each other, it is difficult to soften the sheet-like member sufficiently. The glass transition temperatures of the sheet-like member and the carrier sheet can be measured by differential scanning calorimetry (DSC).

The DSC is desired to be conducted based on the following measurement standard.
ISO 11357-1 1997 Plastics—Differential scanning calorimetry (DSC)—Part 1: General principles; and
ISO 11357-2-1999 Plastics—Differential scanning calorimetry (DSC)—Part 2: Determination of glass transition temperature; P-310.

A material for the carrier sheet is not particularly limited, but there are metals such as Al and Cu, glass, carbon, ceramics, an organic polymer material, etc. In addition, in order to provide the carrier sheet with an excellent flexibility, an organic polymer material is preferable. Using a soft material allows it to make the sheet for manufacturing a concave-convex pattern closely in contact with even a curved substrate at low pressure. Also in order to remove the sheet later, dry etching using oxygen gas easily removes the organic polymer material with a high content of oxygen and without Si or Al.

Examples of the organic polymer material include kinds of polyolefin such as polyethylene and polypropylene, kinds of polyester such as polyethylene terephthalate (PET), kinds of polycarbonate, kinds of cellulosics such as acetyl cellulose, kinds of polyimide, and kinds of polyamide. Kinds of olyester such as PET, etc. are excellent in a relatively low cost and a certain level of a heat resistance. A plasticizer, an antioxidant, an ultraviolet absorber, an antiblocking agent, a slip agent, a coloring agent, an antistatic agent, etc. can also be added to the organic polymer material if needed.

The carrier sheet may be a flattened imperforate film or a porous film. The carrier sheet may be a woven cloth or a nonwoven cloth. The carrier sheet may also be a sheet-like fiber-reinforced plastic (FRP). A thickness of the carrier sheet is not particularly limited, but the thickness of the carrier sheet is preferably not less than about 0.5 μm and not more than about 30 μm. More preferably, the thickness of the carrier sheet is not less than about 1 μm and not more than about 15 μm. If the carrier sheet is too thin, the carrier sheet easily breaks or wrinkles to be difficult to handle. On the other hand, if the carrier sheet is too thick, the carrier sheet is difficult to remove by dry etching. In addition, the sheet for manufacturing a concave-convex pattern easily peels from the substrate owing to a thermal stress, etc.

A thickness of the sheet-like member is not particularly limited, and can be optionally determined according to the height of the step 6 on the surface of the substrate 5. From a viewpoint of the adaptiveness of the sheet-like member to steps of the substrate, the sheet-like member preferably has a thickness of 3 times or more of the vertical step of the substrate, and more preferably has a thickness of 10 times or more thereof. However, if the sheet-like member is too thick, it becomes difficult to remove the sheet-like member by etching. It is required to design a thickness of the sheet-like member while considering a desirable thickness of the sheet for manufacturing a concave-convex pattern or the carrier sheet. For example, when using an LED substrate having the step 6 with a height of about 0.3 μm due to an electrode for the substrate 5, it is preferable to combine the sheet-like member having a thickness of 1 μm to 5 μm with a 10 μm-thick carrier sheet. Or, the sheet-like member having a thickness of about 15-μm can be employed without providing the carrier sheet.

The concave-convex pattern layer and the reverse concave-convex pattern layer have concave-convex patterns which are meshed with each other, each a continuous layer in an in-plane direction. The concave-convex pattern is a pattern where at least one of a concave/convex thereof size and a gap between the adjacent processed concaves/convexes thereof is 1 μm or less. The two-dimensional shape of the concave-convex pattern is not particularly limited. Examples of the two-dimensional shape include a pattern having dots arranged with a pitch of 1 μm or less. Here, the dots are convexes or concaves which assemble to form a pattern. The "pitch" means a state where convexes or concaves exist repeatedly at a constant distance, thereby meaning that a center-to-center distance between the adjacent concaves or between the adjacent convexes is uniform. However, there may be some irregularities due to variations in a manufacturing process, etc.

Although the size of fine concaves or convexes is not particularly limited, the size thereof is 1 to 100% of the pitch. The size of fine convexes means an average of radiuses of sections to be obtained when the fine convexes are sliced at a height of ½ of the height thereof. The size of fine concaves is an average of radiuses of sections to be obtained when the fine concaves are sliced at a depth of ½ of the depth thereof. The radiuses of 100 pieces of the fine convexes or concaves randomly selected were measured using an atomic force microscope, etc. to average the obtained radiuses thereof (arithmetic average), thereby yielding the average radius. The radius is defined as a turning radius.

The height of the fine concaves or the depth of the fine convexes is not particularly limited, but the height or the depth is about 1 to 1000% of the pitch of the concave-convex pattern.

As a two-dimensional shape of another concave-convex pattern, there is a pattern where straight lines or curved lines having a length of 1 μm or less are arranged with a pitch of 1 μm or less. Although a difference between the heights of the line segment and the basal plane of the concave-convex pattern is not limited particularly, the difference is about 1 to 1000% of the pitch.

When using these concave-convex patterns to manufacture an antireflective structure, a diffraction grating, etc. for an optical element or as a template of its structure, a concave-convex pattern with a pitch of 0.1 μm to 0.4 μm is preferably used.

A film thickness of the concaves of the concave-convex pattern layer or the reverse concave-convex pattern layer is not limited particularly. However, the film thickness of the concaves thereof is preferably 1% to 60% of the film thickness of the convexes, or more preferably 5% to 20% of the film thickness of the convexes. If the thickness of the concaves is too thick, it becomes difficult to etch the substrate with a high contrast. On the contrary, if the thickness of the concaves is too thin, the sheet-like member easily breaks, thereby causing the peel-off thereof from the substrate due to break-in of the softened sheet-like member or dust trapping.

The term "mesh" means that convexes on a side enter concaves on the other side, and then both the convexes and the concaves complementally couple with each other. The concave-convex pattern block and the reverse concave-convex pattern layer do not necessarily need to be directly in contact with each other at the interface therebetween, and may have an interface layer therebetween.

Materials constituting the concave-convex pattern layer 3 and the reverse concave-convex pattern layer 4 are not particularly limited. The materials include organic materials such as an organic polymer, metals such as Al, oxides such as silica, alumina, etc., silicon, silicon compounds, compound semiconductors, and ceramics. A method for manufacturing films of the materials is not limited particularly, but well-known techniques, such as a coating technique, vacuum deposition, CVD, sputtering, and plating, are employed. Films can be made also using a sol-gel method of silica, etc.

An organic polymer is soft and suitable for forming a film with a concavo-convex shape, thereby yielding an excellent leveling performance to cover convexoconcave.

Examples of the organic polymer include the followings:
  kinds of polyvinyl, such as polyvinyl alcohol;
  kinds of polyalkylene oxide, such as cellulose ether, polyethylene oxide, and polypropylene oxide;
  polyolefin, such as polyethylene and polypropylene;
  polystyrene derivatives, such as polystyrene, and poly alpha methylstyrene;
  an acrylic resin and its derivatives;
  kinds of polyester such as polyethylene terephthalate;
  kinds of polycarbonate;
  a fluororesin;
  a phenol resin and its derivatives;
  a silicone resin;
  a polyamide resin;
  a polyimide resin; and
  an epoxy resin.

The organic polymer materials or the precursors thereof are dissolved in a solvent to be a solution, and the solution is applied with methods such as a spin coating method and a doctor blade method. Alternatively, after applying a light-curing resin composition without a solvent, light curing may be carried out with ultraviolet irradiation, etc. The light curing is carried out while compressively bonding a sheet separately prepared in the same way as in ultraviolet imprinting, thereby allowing it to reduce the thickness of the concaves. For this reason, a difference between the thicknesses of the concaves and the convexes can be made large, thereby allowing it to well transfer the concave-convex pattern onto the substrate with a high contrast.

One of the concave-convex pattern layer and the reverse concave-convex pattern layer preferably contains a metallic element or a metalloid element in order to prove a resistance for dry etching. The containing of a metallic element or a metalloid element allows it to well transfer the concave-convex pattern by dry etching. It is preferable to combine the layer including a metallic element or a metalloid element with the layer without the elements.

The metallic element means an element having a metallic character, and the examples of the metalloid element include B, Si, Ge, As, Sb, Te, and Po. When safety and affinity with a semiconductor process is taken into consideration, Al, Si, and Ti are preferable. The metallic and metalloid elements preferably combine with oxygen atoms to be chemically stable in the layers from the view point of safety. Alternatively, an organometallic complex may also be made from the metallic or metalloid elements. As the specific material including the metallic or metalloid elements, a silicone resin, poly pentamethyl disilyl styrene, etc. are employed. A silicone resin which is formed of Si combined with oxygen atoms is particularly preferable. As the specific material not including the metallic and metalloid elements, polystyrene, an acrylic resin, and those derivatives are employed.

At least one of the glass transition temperatures of the concave-convex pattern layer and the reverse concave-convex pattern layer is preferably higher than the glass transition temperature of the sheet-like member. Accordingly, even when the sheet-like member softens, the shape of the concave-convex pattern is maintained. On the other hand, when the concave-convex pattern layer or the reverse concave-convex pattern layer is made of an elastomer, it is preferable that the glass transition temperature of the concave-convex pattern layer or the reverse concave-convex pattern is lower than that of the sheet-like member.

In the concave-convex pattern manufacturing method of this embodiment, the concave-convex pattern layer or the reverse concave-convex pattern layer is compressively bonded with heating the sheet-like member to be softened. Then the softened sheet-like member is cooled to be hardened again. Then, the sheet-like member shrinks so that a shear stress is applied between the substrates and the sheet-like member. For this reason, the concave-convex pattern layer or the reverse concave-convex pattern layer peels easily from the substrate. However, when the concave-convex pattern layer and the reverse concave-convex pattern layer are made of an elastomer, the transition temperatures thereof are lower than the transition temperature of the sheet-like member. Even after the sheet-like member is hardened, the concave-convex pattern layer and the reverse concave-convex pattern layer are still soft. Therefore, after the sheet-like member is hardened, the shear stress is relaxed, thereby making the peel-off of the sheet-like member difficult. This allows it to thin the adhesive layer to adhere the concave-convex pattern layer or the reverse concave-convex pattern layer to the substrate. When the adhesive layer is thin, a concave-convex pattern corresponding to the reverse concave-convex pattern can be transferred to the substrate with a high contrast by etching.

The concave-convex pattern block and the reverse concave-convex pattern layer are continuous on the surface of the substrate, and are therefore resistant to expansion and contraction in an in-plane direction of the substrate. Since the concave-convex pattern block and the reverse concave-convex pattern layer are meshed with each other, the interface therebetween is hard to separate, thereby causing no risk of deforming the concave-convex pattern. For example, even carrying the sheet for manufacturing a concave-convex pattern by a roll-to-roll method hardly produces a crack therein. Compressively bonding the concave-convex pattern block or the reverse concave-convex pattern layer to the substrate creates no risk of deforming the concave-convex pattern in an in-plane direction of the substrate. Around a step where a strong in-plane shear stress is applied, the concave-convex pattern block or the reverse concave-convex pattern layer is decoupled by the shear stress, thereby making it difficult to generate the deformation of the concave-convex pattern due to expansion and contraction. In addition, the decoupling prevents uplifts of the concave-convex pattern block or the reverse concave-convex pattern layer at the step. Therefore, the concave-convex pattern can be certainly formed also on the step portions.

Particularly, both the concave-convex pattern layer and the reverse concave-convex pattern layer are continuous films, and do not have a portion which separates easily from surrounding areas like, e.g., a particle. Therefore, even if a strong tensile or shear stress is applied to the layers at the step portions, the layers do not break, thereby creating no risk of producing flakes of the layers to be imported to a manufacturing process. After compressively bonding, the surface of the substrate is protected by the laminated structure formed of the continuous films, thereby allowing it to effectively prevent the substrate from being damaged owing to steps of the substrate.

An original disk for general nanoimprint lithography is too hard to fit to steps of the substrate, and therefore needs a thick adhesive layer to cover the steps of the substrate. The thick adhesive layer makes it difficult to form a concave-convex pattern onto the substrate with a high contrast. The method for manufacturing a concave-convex pattern of this embodiment provides the adaptiveness to steps of a substrate. Therefore, the adhesive layer is not required to be thick, and is not needed at all in some cases.

The concave-convex pattern layer or the reverse concave-convex pattern layer undergoes a plastic deformation over a yielding point or an elastic deformation thereof to fit to the steps of the substrate. The case of the elastic deformation requires an elastomer to make the concave-convex pattern layer or the reverse concave-convex pattern layer therefrom. The elastomer allows it to prevent the concave-convex pattern layer or the reverse concave-convex pattern layer from peeling from the substrate as a result of thermal stresses. The plastic deformation generates a small elastic recovery at the time of unloading, i.e., finishing the pressurization, thereby preventing peel-off from the steps due to a large elastic recovery. Making the concave-convex pattern layer or the reverse concave-convex pattern layer fracture at step edges of the substrate increases the adaptiveness to the steps of the substrate. That is, making the concave-convex pattern layer and the reverse concave-convex pattern layer fit to the sidewalls of the steps requires both the layers to elongate in an in-plane direction, thereby leading to a deformation of the concave-convex pattern or peel-off from the substrate.

On the other hand, making the concave-convex pattern layer or the reverse concave-convex pattern layer fracture at step edges of the substrate does not require both the layers to elongate in an in-plane direction, thereby preventing the deformation of the concave-convex pattern. This also allows it to precisely form the concave-convex pattern even around the steps of substrate without lacking the concave-convex pattern. Even if dusts are trapped, the lacking of the concave-convex pattern can be confined to an area where the dusts are trapped.

The adhesive layer 13 to be disposed between the sheet-like member 10 and the concave-convex pattern layer 11 is not particularly limited if including thermoplastics or a B-stage resin as well as the sheet-like member to be softened. An organic polymer material which substantially contains neither a metallic element nor a metalloid element is preferable, because the organic polymer material can be easily removed by oxygen plasma ashing, etc. For example, polystyrene derivatives, such as poly-α-methylstyrene, an acrylic resin and its derivatives, an epoxy resin/phenol resin and their derivatives, etc. are also employed. Resins for hot melt coating such as an ethylene-acetic acid vinyl system, a polyurethane system, a polyolefin system, and a polyamide system may be employed.

The glass transition temperature of the adhesive layer 13 is preferably comparable to that of the sheet-like member 10 so that the adhesive layer 13 is not prevented from fitting to the step 15 of the sheet-like member 10. When the glass transition temperature of the adhesive layer and that of sheet-like member differ from each other by 5° C. or less, both the glass transition temperatures are regarded as comparable.

The thickness of the adhesive layer is not particularly limited, but the adhesive layer is made to have a thickness proving a sufficient adhesive strength to the substrate surface. The thickness of the adhesive layer is preferably not less than about 0.05 μm and not more than about 5 μm. More preferably, the thickness is not less than about 1 μm and not more than about 3 μm. If the adhesive layer is too thin, the adhesive strength to the substrate is inadequate. On the other hand, if the adhesive layer is too thick, the adhesive layer will become difficult to remove by etching etc.

Generally, an adhesion interface is very suitable for the peel-off as a result of a peeling stress from the ends of the interface. That is, the peel-off starts easily from the ends or the steps of the substrate. However, the adhesive layer placed between the reverse concave-convex pattern layer and the substrate is thickened in order to prove the adhesive strength, thereby making it difficult to form a concave-convex pattern on the substrate with a high contrast.

If the adhesive layer is disposed behind the concave-convex pattern block, the concave-convex pattern block breaks at the ends or the steps of the substrate at the time of compressing the sheet for manufacturing a concave-convex pattern to the substrate, thereby causing an exposure of the adhesive layer from behind the concave-convex pattern block. When the exposed adhesive layer adheres to the substrate, the peel-off between the sheet for manufacturing a concave-convex pattern and the substrate can be suppressed effectively. In addition, if the adhesive layer is removed, e.g., by oxygen plasma ashing etc., this adhesive layer has no influence when etching the surface of the substrate. The adhesive layer may double as a buffer layer absorbing the steps of substrate. Also in this case, since the sheet-like member mainly absorbs the steps of the substrate, it is not necessary to make the adhesive layer thicker than needed. For this reason, if the sheet-like member is peeled off to be removed, the adhesive layer can be easily removed by oxygen plasma ashing. That is, the sheet-like member and the adhesive layer can share functions for both absorbing the steps of the substrate and bonding the sheet-like member to the ends and steps of substrate. As a result, it becomes possible to easily removing the sheet-like member or the adhesive layer, and to prevent the peel-off of the sheet-like member from the substrate.

The adhesive layer protects fracture portions of the concave-convex pattern layer or the reverse concave-convex pattern layer, thereby allowing it to prevent the concave-convex pattern layer or the reverse concave-convex pattern layer from peeling as a result of a wash solution penetrating into the fracture portions.

If dusts exist, the dusts pass through the reverse concave-convex pattern layer, and are involved into the adhesive layer to be fixed to the adhesive layer. Then, the adhesive layer is peeled off together with the sheet-like member to remove the dusts together therewith. In order to make it easy to peel off, it is preferable to employ an adhesive agent to easily peel off from the interface on the side of the reverse concave-convex pattern layer while the adhesive agent bonds the sheet-like member with the substrate or the dusts strongly.

An adhesive layer may be formed on an adhesion surface of the substrate of the sheet for manufacturing a concave-convex pattern in addition of the adhesive layer disposed between the sheet-like member and the concave-convex pattern layer. A material of the adhesive layer is not particularly limited, and well-known adhesive agents and adhesives are employed. The adhesive layer should be characteristically as follows. That is, the adhesive layer does not easily attract dusts, and is heated to soften for softening the sheet-like member, thereby improving the adhesiveness between the reverse concave-convex pattern layer and the substrate. A B-Stage resin and a thermoplastic resin, etc. are preferably employed for the adhesive layer.

Here, a thickness of the adhesive layer is not particularly limited. The adhesive layer preferably has a sufficient thickness to prove an adhesive strength for the sheet for manufacturing a concave-convex pattern to the surface of the substrate. The thickness is preferably not less than 0.02 μm and not more than 1 μm. More preferably, the thickness is not less than 0.05 μm and not more than 0.5 μm. If the adhesive layer is too thin, the adhesive strength thereof is not sufficient. If the adhesive layer is too thick, it will become difficult to etch the substrate surface.

A material of the adhesive layer is not particularly limited, but is preferably selected from the view point of the etching characteristic for the concave-convex pattern layer or the reverse concave-convex pattern layer. For example, when the concave-convex pattern layer or the reverse concave-convex pattern layer contains a metallic element or a metalloid element, it is preferable to employ an adhesive layer that is etched fast under an etching condition for transferring a concave-convex pattern onto the substrate. Specifically, the material is preferably an organic polymer which substantially contains neither a metallic element nor a metalloid element. Examples of the organic polymer include polystyrene derivatives such as poly α-methylstyrene, an acrylic resin and its derivatives, an epoxy resin, a phenol resin and its derivatives, etc. Hot melt coating resins, such as an ethylene-acetic acid vinyl system, a polyurethane system, a polyolefin system, and a polyamide system, may be employed.

On the other hand, when using the adhesive layer as a pattern transfer layer for once transferring the pattern of the concave-convex pattern layer or the reverse concave-convex pattern layer, the adhesive layer with a sufficient etching resistance is preferably employed under an etching condition for transferring the concave-convex pattern onto the substrate. Specifically, the materials containing a metallic element or metalloid element, etc. is preferable, and therefore, for example, a silicone resin, a spin-on glass with a reflowing performance, etc. are preferably employed.

An anti-etching layer may be provided between the reverse concave-convex pattern layer and the sheet-like member. The anti-etching layer once stops a progress of etching on the reverse concave-convex pattern layer to make it difficult to cause nonuniformity of etching. Removing the sheet-like member by etching is followed by removing the anti-etching layer with changing etching conditions. The anti-etching layer can be disposed also between the carrier sheet and the sheet-like member. The anti-etching layer is disposed between the sheet-like member and the reverse concave-convex pattern layer to more reduce nonuniformity of etching.

Materials of the anti-etching layer preferably include substances which contain metallic elements or metalloid elements to have a resistance to reactive ion etching. The substances which contain at least one of Si and Al are preferable, and include, e.g., silica, alumina, and aluminum. The anti-etching layer including silica, alumina, or aluminum can be easily formed, for example, by sputtering or vacuum deposition. The anti-etching layer including silica can be formed by applying silica precursors, e.g., polysilazane using a sol gel method.

The thickness of the anti-etching layer is not particularly limited, but is preferably not less than about 1 nm and not more than about 100 nm. More preferably, the thickness thereof is not less than about 5 nm and not more than about 20 nm. If the anti-etching layer is too thin, stopping of etching is not sufficient, thereby causing nonuniformity of etching easily. On the other hand, if the anti-etching layer is too thick, it becomes difficult to remove the anti-etching layer by etching.

A peeling layer may be formed between the carrier sheet and the sheet-like member, or between the sheet-like member and the reverse concave-convex pattern layer in order to easily peel off the carrier sheet and the sheet-like member. When softening the sheet-like member, there is a risk that the sheet-like member is bonded to the adjacent layer like a hot melt adhesive. Then, it is preferable to provide the peeling layer between the sheet-like member and the adjacent layer thereto.

The material for the peeling layer preferably has a glass transition temperature or a melting point, if the material has no glass transition temperature, higher than the glass transition temperature of the sheet-like member. When softening the sheet-like member, the peeling layer softens simultaneously to create a risk that the peeling performance falls down. Materials for the peeling layer include organic polymer materials such as a silicone resin and a fluorine resin, oxides such as silica or alumina, carbons such as diamond like carbon etc., and metal such as aluminum. A method of manufacturing the peeling layer is not particularly limited, but can suitably use publicly known techniques, such as a coating method, an electroplating method, a sputtering method, and a vacuum deposition method.

A thickness of the peeling layer is not particularly limited, and may be a monomolecular layer with a peel property. Generally, the thickness of the peeling layer is not less than about 1 nm and not more than about 100 nm, and is more preferably not less than about 5 nm and not more than about 20 nm. If the peeling layer is too thin, there is a risk that the peel property thereof may become inhomogeneous. On the other hand, if the peeling layer is too thick, the peeling layer becomes difficult to remove by etching etc. A gas-forming layer may be used instead of the peeling layer. A gas may be formed with light irradiation or heating, and the carrier sheet or the sheet-like member undergoes a self peel-off due to the formed gas. As the gas-forming layer, substances containing an azide compound, etc. is preferable, and the sheet-like member may serve also as a gas-forming layer.

When the concave-convex pattern layer and the reverse concave-convex pattern layer contain substantially neither a metallic element nor metalloid element, it is preferable to dispose a pattern transfer layer between the reverse concave-convex pattern layer and the substrate. The pattern transfer layer is preferably disposed, e.g., between the reverse concave-convex pattern layer and the adhesive layer, or between the adhesive layer and the substrate. The pattern transfer layer is processed by using the concave-convex pattern layer or the reverse concave-convex pattern layer as an etching mask. Then, the substrate is etched using the processed pattern transfer layer as a hard mask. Oxides, such as silica, alumina and chromic oxide, nitrides, e.g., silicon nitride, metals such as Al, Cr, Mo, etc., silicide compound, e.g., molybdenum silicide may be selected as publicly known materials for a hard mask when the etching selectivity thereof is taken into consideration.

The thickness of the pattern transfer layer is not particularly limited. The thickness is preferably not less than about 5 nm and not more than about 100 nm. More preferably, the thickness is not less than about 10 nm and not more than about 50 nm. If the pattern transfer layer is too thin, there is a risk that the pattern transfer layer does not serve as a hard mask. On the other hand, if the pattern transfer layer is too thick, the pattern transfer layer becomes difficult to remove by etching etc. after pattern transfer.

As mentioned above, using the method for manufacturing a concave-convex pattern and the sheet for the same of the present embodiment allows it to provide the concave-convex pattern without damaging a substrate to be easily broken by its steps.

Several examples are shown below in order to explain aspects of the invention more in detail. However, the aspects of the invention are not limited to the examples shown below.

EXAMPLE 1

First, the sheet for manufacturing a concave-convex pattern was produced using a 12-μm thick sheet of polyethylene terephthalate (PET) as a carrier sheet. A 20-μm thick sheet of polyvinyl alcohol (PVA) with glycerin (plasticizer) added was prepared as a sheet-like member. The 20 μm thick PVA sheet was laminated onto the carrier sheet so that the 20 μm thick PVA sheet and the carrier sheet were bonded with thermal compression bonding. A 50-nm thick silica layer was formed by vacuum deposition on the PVA sheet bonded with thermal compression bonding. A silica layer serves as an anti-etching layer.

The surface of the silica layer was hydrophobized. A 2P agent was applied to the silica layer by a doctor blade method to obtain a 100 nm-thick applied film. A 2P agent is a resin composition to be cured with ultraviolet, and includes a monomer, oligomer, and a polymerization initiator. Isobornyl acrylate (IBOA), diacrylate (PUDA) and 2-hydroxy-2-methyl-1-phenyl-propane-1-1-on were used as the monomer, the oligomer and the polymerization initiator, respectively. The weight percents of IBOA, PUDA and the polymerization initiator were 85%, 10%, and 5%, respectively.

A concave-convex pattern layer was formed on the applied film of the 2P agent by carrying out ultraviolet imprinting using a glass stamper. The concave-convex pattern layer formed was observed with a scanning electron microscope (SEM). The SEM observation reveals that convexes of the layer was cylindrical, and to have a diameter of 0.25 μm with a pitch of about 0.3 μm. A difference in height between the convexes and concaves was about 0.1 μm, and a depth of the concaves was about 10 nm.

A spin-on glass (SOG) was applied on the concave-convex pattern layer to form the reverse concave-convex pattern layer. An SEM observation revealed that the reverse concave-convex pattern layer was formed to mesh with the concave-convex pattern layer so as to cover unevenness of the concave-convex pattern layer. The depth of the concaves of the reverse concave-convex pattern layer was about 10 m.

A methanol solution of a phenol resin was applied on the reverse concave-convex pattern layer to form an adhesive layer including a 50 nm-thick phenol resin layer. The sheet for manufacturing a concave-convex pattern was obtained via the above process.

A GaP wafer with an about 0.3 μm-high step on its surface was prepared as a substrate on which a concave-convex pattern is formed. Silica fine particles with a diameter of 5 μm were scattered as dummy dusts on the substrate. The sheet for manufacturing a concave-convex pattern was laminated onto the substrate with the silica particles on its surface, and the laminated layers were compressed at a pressure of about 1000 Pa while heating. After compressing, the sheet for manufacturing concave-convex pattern was bonded to be thoroughly in contact with the GaP substrate. Peel-off was not observed at the step or edge of the GaP substrate.

After bonding, the carrier sheet was peeled off and washed further with water. Thus, the sheet-like member was removed. Then, residues were removed by reactive ion etching using oxygen gas. After removing residues, an SEM observation was carried out. The SEM observation revealed that failures such as inhomogeneous etching did not take place.

The concave-convex pattern layer and reverse concave-convex pattern layer of the sheet for manufacturing a concave-convex pattern were transferred onto the GaP substrate via the above operations. The transferred concave-convex pattern layer and reverse concave-convex pattern layer respectively adhered to the GaP substrate owing to the adhesive layer, and flakes did not disperse. Both the two layers were transferred to well fit to steps or fine surface unevenness of the GaP substrate. The silica fine particles scattered as dummy dusts went through the concave-convex pattern layer and the reverse concave-convex pattern layer, and were exposed. Significant peel-off around the silica fine particles was not observed.

The surface of the GaP substrate was processed by reactive ion etching using the transferred reverse concave-convex pattern layer as an etching mask. First, reactive ion etching using a CF4 gas removed the silica layer. The etching was conducted for a minute under the following conditions: a pressure of 10 mTorr; a flow rate of 30 sccm; and a power of 100 W.

Subsequently, reactive ion etching using oxygen removed the concave-convex pattern layer. The reactive ion etching was conducted for 3 minutes under the following conditions: a pressure of 10 mTorr; a flow rate of 30 sccm; and a power of 100 W. After etching, an SEM observation revealed that the reverse concave-convex pattern layer was exposed to the surface, and disorder, peel off, etc. of the concave-convex pattern were not observed.

Furthermore, the reactive ion etching using a BCl2/Cl2 mixed gas was carried out using the reverse concave-convex pattern layer as an etching mask, and etched the surface of the GaP substrate. The etching of the BCl2/Cl2 mixed gas was conducted for a minute under the following conditions: a pressure of 10 m Torr; a flow rate of 5 sccm for BCl2; a flow rate of 20 sccm for Cl2; and a power of 100 W.

After etching, an SEM observation revealed that GaP protrusions with a diameter of about 0.23 μm and a height of 0.3 μm were formed innumerably with a pitch of about 0.3 μm. The GaP protrusions were formed also around the steps preliminarily formed on the surface of the GaP substrate. Furthermore, the GaP protrusions were formed around the silica fine particles without lacking the protrusions.

EXAMPLE 2

In this example, the concave-convex pattern was formed on the surface of the substrate using the sheet for manufacturing a concave-convex pattern with an adhesive layer.

First, the sheet for manufacturing a concave-convex pattern was produced using a 12-μm thick sheet of polyethylene terephthalate (PET) as a carrier sheet. A 20-μm thick sheet of polyvinyl alcohol (PVA) with glycerin (plasticizer) added was prepared as a sheet-like member. The 20 μm thick PVA sheet was laminated onto the carrier sheet so that the 20 μm thick PVA sheet and the carrier sheet were bonded with thermal compression. A solution of poly-α-methylstyrene was applied by a doctor blade method to form a 5-μm thick adhesive layer on the PVA sheet bonded with thermal compression. A 50-nm thick silica layer was formed by vacuum deposition on the adhesive layer as an anti-etching layer.

The surface of the silica layer was hydrophobized. A 2P agent was applied to the silica layer by a doctor blade method to obtain a 100 nm-thick applied film. A 2P agent is a resin composition to be cured with ultraviolet, and includes a monomer, oligomer, and a polymerization initiator. As the monomer, the oligomer and the polymerization initiator, isobornyl acrylate (IBOA), diacrylate (PUDA) and 2-hydroxy-2-methyl-1-phenyl-propane-1-1-on were used, respectively. The weight percents of IBOA, PUDA and the polymerization initiator were 85%, 10%, and 5%, respectively.

A concave-convex pattern layer was formed on the applied film of the 2P agent by carrying out ultraviolet imprinting using a glass stamper. The concave-convex pattern layer formed was observed with an SEM. The SEM observation revealed that convexes of the layer were cyrindarical, and to have a diameter of 0.25 μm with a pitch of about 0.3 μm. A difference in height between the convexes and concaves was about 0.1 μm, and a depth of the concaves was about 10 nm.

A spin-on glass (SOG) was applied on the concave-convex pattern layer to form the reverse concave-convex pattern layer. An SEM observation revealed that the reverse concave-convex pattern layer was formed so as to cover unevenness of the concave-convex pattern layer. The depth of the concaves of the reverse concave-convex pattern layer was about 10 nm.

A methanol solution of a phenol resin was applied on the reverse concave-convex pattern layer to form an adhesive layer including a 50 nm-thick phenol resin layer. The sheet for manufacturing a concave-convex pattern was obtained via the above process.

A GaP wafer with an about 0.3 μm-high step on its surface was prepared as a substrate on which a concave-convex pattern is formed. The sheet for manufacturing a concave-convex pattern was laminated onto the substrate with the silica particles on its surface, and the laminated layers was compressed at a pressure of about 1000 Pa with heating. After compressing, the sheet for manufacturing concave-convex pattern was bonded to be thoroughly in contact with the GaP substrate. Peel-off was not observed at the steps or edges of the GaP substrate.

A transmission electron microscope (TEM) observation was carried out to observe the steps or edges cross-sectionally. The TEM observation revealed that the steps or edges went through the concave-convex pattern layer and the reverse concave-convex pattern layer to be in contact with the poly-α-methylstyrene adhesive layer. Even if the same bonding operations were carried out two or more times, peel-off did not occur at the steps or edges of the wafer.

After bonding, the carrier sheet was peeled off to be removed, and further washed with water. Then, residues were removed by reactive ion etching using oxygen gas. After removing residues, a SEM observation was carried out. The SEM observation revealed that failures such as inhomogeneous etching did not take place.

The concave-convex pattern layer and reverse concave-convex pattern layer of the sheet for manufacturing a concave-convex pattern were transferred on the GaP substrate via the above operation. The transferred concave-convex pattern layer and reverse concave-convex pattern layer respectively adhered to the GaP substrate owing to the adhesive layer, and flakes did not disperse.

The surface of the GaP substrate was processed by reactive ion etching using the transferred reverse concave-convex pattern layer as an etching mask. First, the reactive ion etching using a CF4 gas removed the silica layer. The etching was conducted for a minute under the following conditions: a pressure of 10 mTorr; a flow rate of 30 sccm; and a power of 100 W.

Subsequently, reactive ion etching using oxygen removed the concave-convex pattern layer. The reactive ion etching was conducted for 3 minutes under the following conditions: a pressure of 10 mTorr; a flow rate of 30 sccm; and a power of 100 W. After etching, an SEM observation revealed that the reverse concave-convex pattern layer was exposed to the surface, and disorder, peel off, etc. of the concave-convex pattern were not observed.

Furthermore, the reactive ion etching using a BCl2/Cl2 mixed gas was carried out using the reverse concave-convex pattern layer as an etching mask, and etched the surface of the GaP substrate. The etching of the BCl2/Cl2 mixed gas was conducted for a minute under the following conditions: a pressure of 10 mTorr; a flow rate of 5 sccm for BCl2; a flow rate of 20 sccm for Cl2; and a power of 100 W.

After etching, an SEM observation revealed that GaP protrusions with a diameter of about 0.23 μm and a height of 0.3 μm were formed innumerably with a pitch of about 0.3 μm. The GaP protrusions were formed also around the steps preliminarily formed on the surface of the GaP substrate.

EXAMPLE 3

In this example, the concave-convex pattern was formed on the surface of the substrate using the sheet for manufacturing a concave-convex pattern with a concave-convex pattern block directly impressed on the sheet-like member.

First, the sheet for manufacturing a concave-convex pattern was produced using a 100-μm thick sheet of polycarbonate as a sheet-like member. A thermal imprint was carried out using a Ni stamper to form the concave-convex pattern block on the sheet-like member. The concave-convex pattern layer obtained was observed with an SEM. The SEM observation revealed that convexes of the layer were cylindrical holes with a diameter of 0.25 μm and a depth of 0.1 μm, and had a pitch of about 0.3 μm.

A 2P agent was applied on this concave-convex pattern block with a doctor blade method. A 2P agent is a resin composition to be cured with ultraviolet, and includes a monomer, oligomer, and a polymerization initiator. Isobornyl acrylate (IBOA), diacrylate (PUDA) and 2-hydroxy-2-methyl-1-phenyl-propane-1-1-on were used as the monomer, the oligomer and the polymerization initiator, respectively. The weight percents of IBOA, PUDA and the polymerization initiator were 85%, 10%, and 5%, respectively.

A glass plate with its surface treated for demolding was compressively pressed on the applied film of the 2P agent to form a reverse concave-convex pattern layer with ultraviolet irradiation. The concave-convex pattern layer obtained was observed with an SEM. The SEM observation revealed that convexes of the layer were cylindrical to have a diameter of 0.25 μm and a depth of 0.1 μm, and had a pitch of about 0.3 μm. A difference in height between the convexes and concaves was about 0.1 μm, and a depth of the concaves was about 10 nm.

A methanol solution of a phenol resin was applied on the reverse concave-convex pattern layer to form an adhesive layer including a 50 nm-thick phenol resin layer. The sheet for manufacturing a concave-convex pattern was obtained via the above process.

A GaP wafer with an about 0.3 μm-high step on its surface was prepared as a substrate on which a concave-convex pattern is formed. Fluorescent silica fine particles with a diameter of 5 μm were scattered as dummy dusts on the substrate. The sheet for manufacturing a concave-convex pattern was laminated onto the substrate with the silica particles on its surface, and the laminated layers was compressed at a pressure of about 1000 Pa while heating. After compressing, the sheet for manufacturing concave-convex pattern was bonded to be thoroughly in contact with the GaP substrate.

Peel-off was not observed at the steps or edges of the GaP substrate.

A TEM observation was carried out to observe the steps or edges cross-sectionally. The TEM observation revealed that the steps or edges cut the reverse concave-convex pattern layer. The fluorescent silica fine particles scattered as dummy dusts went through the concave-convex pattern layer and the reverse concave-convex pattern layer, and dug into the sheet-like member. After applying, the sheet-like member was peeled off from the GaP substrate by grasping a portion thereof protruded over the GaP substrate as if flicking up the portion. The reverse concave-convex pattern layer of the sheet for manufacturing a concave-convex pattern was transferred onto the GaP substrate via the above operations.

The transferred reverse concave-convex pattern layer adhered to the GaP substrate owing to the adhesive layer, and flakes did not disperse. The transferred reverse concave-convex pattern layer was transferred to well fit to steps or fine surface unevenness of the GaP substrate. Furthermore, an SEM observation revealed that no fluorescent silica fine particle was on the surface of the substrate. The SEM observation revealed also that some holes were open on the reverse concave-convex pattern layer. The holes were considered to be trails of the fluorescent silica fine particle taken out. No fluorescence of the fluorescent silica fine particles was observed on the surface of the substrate.

Fluorescence was observed from the sheet-like member peeled off, and was considered to result from the fluorescent silica fine particles. As mentioned above, the fluorescence silica particles scattered as dummy dusts were considered to be caught by the softened sheet-like member and to be removed from the substrate at the same time as peeling off the sheet-like member.

The surface of the GaP substrate was processed by reactive ion etching using the transferred reverse concave-convex pattern layer as an etching mask. First, reactive ion etching using a CF4 gas removed the silica layer. Subsequently, convexes of the left reverse concave-convex pattern layer and the adhesive layer just below the left reverse concave-convex pattern layer were used as an etching mask to etch the GaP substrate using a mixed gas of Cl2 and BCl2. Then the left reverse concave-convex pattern layer was removed by ashing of oxygen.

After etching, an SEM observation revealed that GaP protrusions with a diameter of about 0.2 μm and a height of 0.3 μm were formed innumerably with a pitch of about 0.3 μm. The GaP protrusions were formed also around the steps preliminarily formed on the surface of the GaP substrate.

What is claimed is:
1. A sheet for manufacturing a concave-convex pattern comprising:
a sheet-like member including a thermoplastic resin that is softenable by heating;

a concave-convex pattern layer on one of the surfaces of the sheet-like member; and a reverse concave-convex pattern layer continuing over two or more concaves of the concave-convex pattern layer to mesh at least partially with the concave-convex pattern layer, wherein either one of the concave-convex pattern layer and the reverse concave-convex pattern layer includes metallic elements or metalloid element, wherein glass transition temperatures of the concave-convex pattern layer and the reverse concave-convex pattern layer are higher than a glass transition temperature of the sheet-like member, wherein the reverse concave-convex pattern layer is preformed to have the reverse concave-convex pattern such that convexes of the reverse concave-convex pattern layer fit to infill concaves of the concave-convex pattern block.

2. The sheet according to claim 1, wherein
the concave-convex pattern is formed over a whole surface of the sheet for manufacturing a concave-convex pattern or only on a partial area of the sheet.

3. The sheet according to claim 1, wherein
two or more kinds of patterns are formed on the sheet for manufacturing a concave-convex pattern.

4. The sheet according to claim 1, wherein
a two-dimensional shape of the sheet for manufacturing a concave-convex pattern is belt-like, rectangular, or disk-like.

5. The sheet according to claim 1, wherein
a thickness of the sheet is not less than 5 μm and not more than 100 μm.

6. The sheet according to claim 1, wherein the sheet-like member includes:

polyvinyl;
polyalkylene oxide;
polyolefin;
polystyrene derivatives;
an acrylic resin and its derivatives;
polyester;
polycarbonate;
a fluororesin;
a phenol resin and its derivates; or
an epoxy resin.

7. The sheet according to claim 1, wherein
the sheet-like member includes a styrene system, an olefin system, a polyvinyl chloride system, a urethane system, an ester system, or an amide system.

8. The sheet according to claim 1, wherein
either one of the concave-convex pattern layer and the reverse concave-convex pattern layer contains a metallic element selected from the group consisting of B, Si, Ge, As, Sb, Te, Po, Al, Si, and Ti, the metallic element combining with an oxygen atom.

9. The sheet according to claim 6, wherein
the polyvinyl includes polyvinyl alcohol, polyaceticacid vinyl and polyvinyl chloride;
the polyalkylene oxide includes polyethylene oxide and polypropylene oxide;
the polyolefin includes polyethylene and polypropylene;
the polystyrene derivatives include polystyrene and poly alpha-methylstyrene; and
the polyester includes polyethylene terephthalate.

10. The sheet according to claim 1, wherein the reverse concave-convex pattern layer includes a solid reverse concave-convex pattern layer.

* * * * *